US012777552B2

(12) United States Patent
Liu et al.

(10) Patent No.: US 12,777,552 B2
(45) Date of Patent: Oct. 27, 2026

(54) USER EQUIPMENTS, BASE STATIONS, AND COMMUNICATION METHODS

(71) Applicant: SHARP KABUSHIKI KAISHA, Sakai City (JP)

(72) Inventors: Liqing Liu, Sakai City (JP); Shohei Yamada, Sakai City (JP); Hiroki Takahashi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 276 days.

(21) Appl. No.: 18/695,040

(22) PCT Filed: Sep. 22, 2022

(86) PCT No.: PCT/JP2022/036617
§ 371 (c)(1),
(2) Date: Mar. 25, 2024

(87) PCT Pub. No.: WO2023/054654
PCT Pub. Date: Apr. 6, 2023

(65) Prior Publication Data
US 2025/0176060 A1 May 29, 2025

(30) Foreign Application Priority Data
Sep. 30, 2021 (JP) ................................ 2021-160861

(51) Int. Cl.
*H04W 76/27* (2018.01)
*H04W 72/23* (2023.01)

(52) U.S. Cl.
CPC .......... *H04W 76/27* (2018.02); *H04W 72/23* (2023.01)

(58) Field of Classification Search
CPC ..... H04L 5/0007; H04L 5/003; H04L 5/0053; H04L 5/0094; H04W 72/0453; H04W 72/23; H04W 76/27
See application file for complete search history.

(56) References Cited

U.S. PATENT DOCUMENTS

| | | | | |
|---|---|---|---|---|
| 12,471,102 B2* | 11/2025 | Lin | ...................... | H04L 5/0053 |
| 2019/0254030 A1* | 8/2019 | Wu | ...................... | H04W 48/12 |
| 2019/0357238 A1* | 11/2019 | Zhou | ...................... | H04W 72/23 |
| 2019/0357262 A1* | 11/2019 | Cirik | ...................... | H04L 5/001 |

(Continued)

*Primary Examiner* — Kashif Siddiqui
(74) *Attorney, Agent, or Firm* — ScienBiziP, P.C.

(57) ABSTRACT

A method by a user equipment (UE) is described. The method includes receiving, from a base station, system information block type1 (SIB1) including a first initial downlink (DL) BWP configuration and a second initial DL BWP configuration for a cell, wherein the first initial DL BWP configuration includes a first RRC parameter indicating a first search space set for other system information (OSI); determining to monitor PDCCH for receiving OSI in a second search space set on a DL BWP provided by the second initial DL BWP configuration, in a first case that the second initial DL BWP configuration includes a second RRC parameter wherein the second RRC parameter indicates the second search space set for OSI; and determining to monitor PDCCH for receiving OSI in the first search space set on a DL BWP provided by the first initial DL BWP configuration, in a second case that the second initial DL BWP configuration does not include the second RRC parameter.

5 Claims, 11 Drawing Sheets

(56) References Cited

U.S. PATENT DOCUMENTS

| | | | | |
|---|---|---|---|---|
| 2019/0357292 | A1* | 11/2019 | Cirik | H04W 76/19 |
| 2022/0039072 | A1* | 2/2022 | Babaei | H04L 5/0053 |
| 2022/0045806 | A1* | 2/2022 | Cirik | H04L 1/1887 |
| 2022/0191839 | A1* | 6/2022 | Ying | H04L 5/0053 |
| 2022/0287102 | A1* | 9/2022 | Futaki | H04L 5/001 |

* cited by examiner

USER EQUIPMENTS, BASE STATIONS, AND COMMUNICATION METHODS

TECHNICAL FIELD

The present disclosure relates to a user equipment, a base station, and a communication method.

BACKGROUND ART

At present, as a radio access system and a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. For some device types, a lower complexity would be required such as to reduce the Rx/Tx antennas and/or the RF/Baseband bandwidth to reduce the UE complexity and the UE cost. However, given the reduced antennas and/or the bandwidth, the flexibility and/or the efficiency of the whole system would be limited. As illustrated by this discussion, systems and methods according to the present invention, supporting how to indicate and determine search space for PDCCH monitoring and/or how to apply RRC parameters during different transmission states the UE is in, may improve the communication flexibility and/or efficiency and be beneficial.

DESCRIPTION OF EMBODIMENTS

Figure 1:
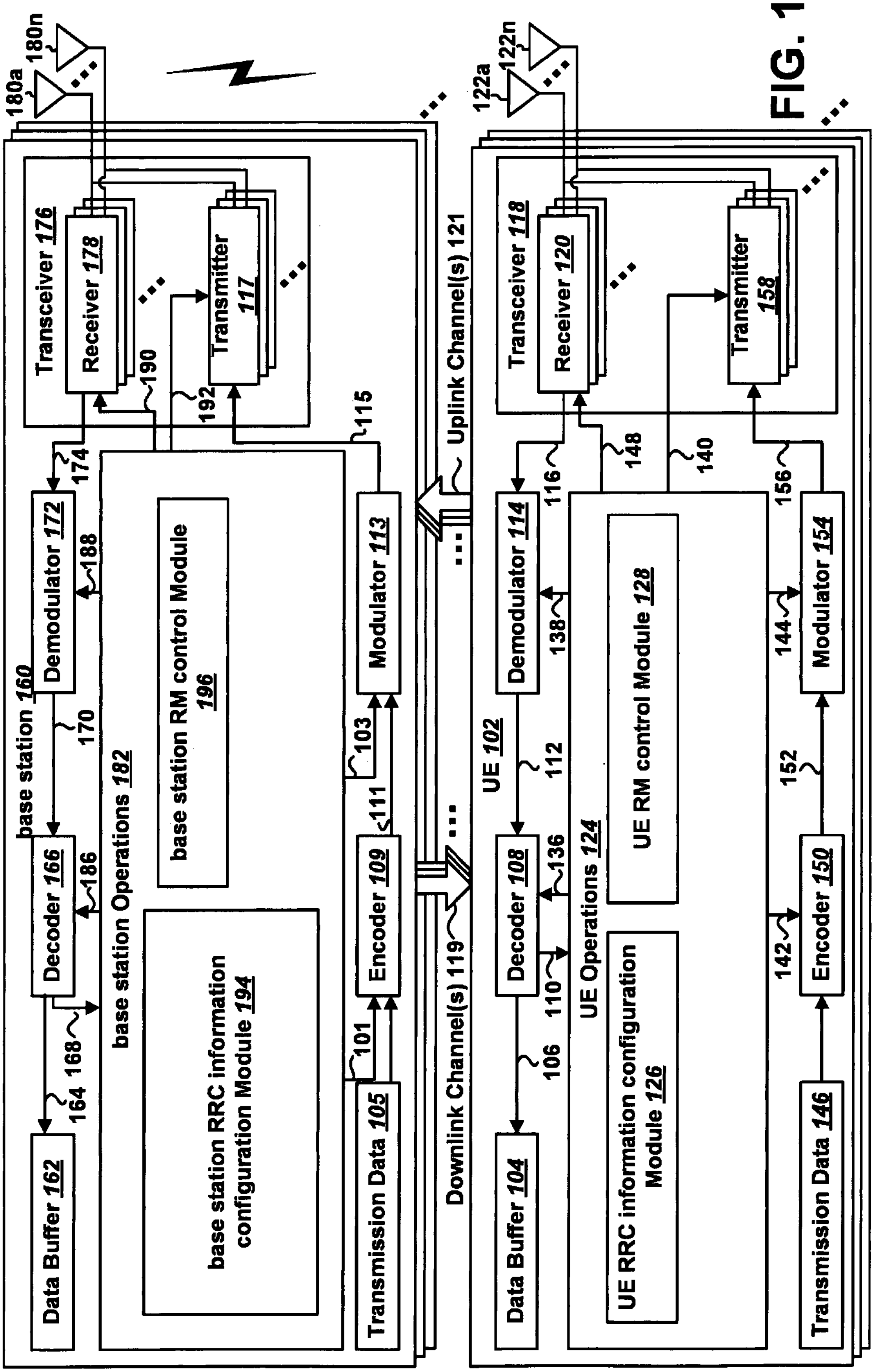
FIG. 1 is a block diagram illustrating one configuration of one or more base stations and one or more user equipments (UEs) in which systems and methods for PDCCH monitoring for CSS set(s) and how to apply RRC parameters may be implemented.

A communication method by a user equipment (UE) is described. The method includes receiving, from a base station, from a base station, system information including a first initial downlink (DL) BWP configuration for a first DL BWP for a cell, a second initial DL BWP configuration for a second DL BWP for the cell and an indication, wherein the first initial DL BWP configuration includes a first RRC parameter indicating a first search space set index and the second initial DL BWP configuration includes a second RRC parameter indicating the second search space set index; in a first case that the indication indicates the UE keeps RRC parameters related to the first initial DL BWP configuration until initiating initial access procedure, determining to use the first search space set index until initiating initial access procedure, and determining to use the second search space set index upon initiating random access procedure; and in a second case that the indication does not indicate the UE keeps the RRC parameters related to the first initial DL BWP configuration until initiating initial access procedure, determining to use the second search space set index upon reception of the second RRC parameter.

A communication method by a base station is described. The method includes transmitting, to a user equipment (UE), system information including a first initial downlink (DL) BWP configuration for a first DL BWP for a cell, a second initial DL BWP configuration for a second DL BWP for the cell and an indication, wherein the first initial DL BWP configuration includes a first RRC parameter indicating a first search space set index and the second initial DL BWP configuration includes a second RRC parameter indicating the second search space set index; determining to use the first search space set index until the UE initiates an initial access procedure, and determining to use the second search space set index during and after the UE initiates random access procedure, in a first case that the indication indicates the UE keeps RRC parameters related to the first initial DL BWP configuration until initiating initial access procedure; and determining to use the second search space set index upon reception of the second RRC parameter by the UE, in a second case that the indication does not indicate the UE keeps the RRC parameters related to the first initial DL BWP configuration until initiating initial access procedure.

A user equipment (UE) is described. The UE includes reception circuitry configured to receive, from a base station, system information including a first initial downlink (DL) BWP configuration for a first DL BWP for a cell, a second initial DL BWP configuration for a second DL BWP for the cell and an indication, wherein the first initial DL BWP configuration includes a first RRC parameter indicating a first search space set index and the second initial DL BWP configuration includes a second RRC parameter indicating the second search space set index; and control circuitry configured to, in a first case that the indication indicates the UE keeps RRC parameters related to the first initial DL BWP configuration until initiating initial access procedure, determine to use the first search space set index until initiating initial access procedure, and determine to use the second search space set index upon initiating random access procedure, in a second case that the indication does not indicate the UE keeps the RRC parameters related to the first initial DL BWP configuration until initiating initial access procedure, determine to use the second search space set index upon reception of the second RRC parameter.

A base station is described. The base station includes transmission circuitry configured to transmit, to a user equipment (UE), system information including a first initial downlink (DL) BWP configuration for a first DL BWP for a cell, a second initial DL BWP configuration for a second DL BWP for the cell and an indication, wherein the first initial DL BWP configuration includes a first RRC parameter indicating a first search space set index and the second initial DL BWP configuration includes a second RRC parameter indicating the second search space set index; and control circuitry configured to, in a first case that the indication indicates the UE keeps RRC parameters related to the first initial DL BWP configuration until initiating initial access procedure, determine to use the first search space set index until the UE initiates an initial access procedure, and determine to use the second search space set index during and after the UE initiates random access procedure, in a second case that the indication does not indicate the UE keeps the RRC parameters related to the first initial DL BWP configuration until initiating initial access procedure, determine to use the second search space set index upon reception of the second RRC parameter by the UE.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc.) for the New Radio Access (NR) and Next generation-Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, 15, and/or 16, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, industrial wireless sensors, video surveillance, wearables, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G-core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460*a* on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC). In the present disclosure, the terms “component carrier” and “carrier” can be interchanged with each other.

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE.

The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience. RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. “PSCell” may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:

- Broadcast of System Information related to Access Stratum (AS) and Non Access Stratum (NAS);
- Paging initiated by CN or RAN;
- Establishment, maintenance and release of an RRC connection between the UE and NR RAN including:
- Addition, modification and release of carrier aggregation;
- Addition, modification and release of Dual Connectivity in NR or between LTE and NR;
- Security functions including key management;
- Establishment, configuration, maintenance and release of signaling radio bearers and data radio bearers;
- Mobility functions including:
- Handover;
- UE cell selection and reselection and control of cell selection and reselection;
- Context transfer at handover.
- QoS management functions;
- UE measurement reporting and control of the reporting;
- NAS message transfer to/from NAS from/to UE.

Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:

- C (Cell)-RNTI: unique UE identification used as an identifier of the RRC Connection and for scheduling;
- CS (Configured Scheduling)-RNTI: unique UE identification used for Semi-Persistent Scheduling in the downlink;
- INT-RNTI: identification of pre-emption in the downlink;
- P-RNTI: identification of Paging and System Information change notification in the downlink;
- SI-RNTI: identification of Broadcast and System Information in the downlink;
- SP-CSI-RNTI: unique UE identification used for semi-persistent CSI reporting on PUSCH;
- CI-RNTI: Cancellation Indication RNTI for Uplink.

For power and slot format control, the following identities are used:

- SFI-RNTI: identification of slot format;
- TPC-PUCCH-RNTI: unique UE identification to control the power of PUCCH;
- TPC-PUSCH-RNTI: unique UE identification to control the power of PUSCH;
- TPC-SRS-RNTI: unique UE identification to control the power of SRS;

During the random access procedure, the following identities are also used:

- RA-RNTI: identification of the Random Access Response in the downlink;
- Temporary C-RNTI: UE identification temporarily used for scheduling during the random access procedure;
- Random value for contention resolution: UE identification temporarily used for contention resolution purposes during the random access procedure.

For NR connected to 5GC, the following UE identities are used at NG-RAN level:

- I-RNTI: used to identify the UE context in RRC_INACTIVE.

The size of various fields in the time domain is expressed in time units $T_c=1/(\Delta f_{max}\times N_f)$ where $\Delta f_{max}=480\times10^3$ Hz and $N_f=4096$. The constant $\kappa=T_s/T_c=64$ where $T_s=1/(\Delta f_{ref}\cdot N_{f,ref})$, $\Delta f_{ref}=15\cdot10^3$ Hz and $N_{f,ref}=2048$.

Multiple OFDM numerologies are supported as given by Table 4.2-1 of [TS 38.211] where μ and the cyclic prefix for a bandwidth part are obtained from the higher-layer parameter subcarrierSpacing and cyclicPrefix, respectively.

The size of various fields in the time domain may be expressed as a number of time units $T_c=1/(15000\times2048)$ seconds. Downlink and uplink transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The number of consecutive OFDM symbols per subframe is $$N_{symb}^{subframe,\mu}=N_{symb}^{slot}N_{slot}^{subframe,\mu}.$$

Each frame is divided into two equally-sized half-frames of five subframes each with half-frame 0 consisting of subframes 0-4 and half-frame 1 consisting of subframes 5-9.

For subcarrier spacing (SCS) configuration u, slots are numbered $$n_s^{\mu}\in\{0,\ \dots\ ,N_{slot}^{subframe,\mu}-1\}$$

in increasing order within a subframe and $$n_{s,f}^{\mu}\in\{0,\ \dots\ ,N_{slot}^{frame,\mu}-1\}$$

in increasing order within a frame.

$$N_{slot}^{subframe,\mu}$$

is the number of slots per subframe for subcarrier spacing configuration μ. There are $$N_{symb}^{slot}$$

consecutive OFDM symbols in a slot where $$N_{symb}^{slot}$$

depends on the cyclic prefix as given by Tables 4.3.2-1 and 4.3.2-2 of [TS 38.211]. The start of slot $$n_s^{\mu}$$

in a subframe is aligned in time with the start of OFDM symbol $$n_s^{\mu}N_{symb}^{slot}$$

in the same subframe. Subcarrier spacing refers to a spacing (or frequency bandwidth) between two consecutive subcarrier in the frequency domain. For example, the subcarrier spacing can be set to 15 kHz (i.e. μ=0), 30 kHz (i.e. μ=1), 60 kHz (i.e. μ=2), 120 kHz (i.e. μ=3), or 240 kHz (i.e. μ=4). A resource block is defined as a number of consecutive subcarriers (e.g. 12) in the frequency domain. For a carrier with different frequency, the applicable subcarrier may be different. For example, for a carrier in a frequency rang 1, a subcarrier spacing only among a set of {15 kHz, 30 kHz, 60 kHz} is applicable. For a carrier in a frequency rang 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for PDCCH monitoring for CSS set(s) and how to apply RRC parameters may be implemented. The one or more UEs 102 may communicate with one or more base stations 160 using one or more antennas 122*a-n*. For example, a UE 102 transmits electromagnetic signals to the base station 160 and receives electromagnetic signals from the base station 160 using the one or more antennas 122*a-n*. The base station 160 communicates with the UE 102 using one or more antennas 180*a-n*.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink scheduling grants. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The UE operations module 124 may include a UE resource management (RM) control module 128. In some implementations, the UE operations module 124 may include physical (PHY) entities, Medium Access Control (MAC) entities, Radio Link Control (RLC) entities, packet data convergence protocol (PDCP) entities, and a Radio Resource Control (RRC) entity. For example, the UE RRC information configuration module 126 may process RRC parameter(s) included in the initial DL BWP configuration A and included in the initial DL BWP configuration B.

The UE RM control module (processing module) 128 may determine to use which search space set provided by which initial DL BWP configuration until initiating initial access procedure and to use which search space set provided by which initial DL BWP configuration upon initiating initial access procedure based on an indication. The indication can be used to indicate whether the UE keeps RRC parameters related to the initial DL BWP configuration A until initiating initial access procedure.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station resource management (RM) control module 196 (or a base station RM processing module 196). The base station operations module 182 may include PHY entities, MAC entities, RLC entities, PDCP entities, and an RRC entity.

The base station RM control module 196 may determine, for respective UE, an indication, different initial DL BWP configuration such as initial DL BWP configuration A and initial DL BWP configuration B and input the information to the base station RRC information configuration module 194. The base station RM control module 196 may determine to use which search space set provided by which initial DL BWP configuration for DL transmission to the UE until the UE initiates the initial access procedure and to use which search space set provided by which initial DL BWP configuration for DL transmission to the UE during and after the UE initiates initial access procedure based on an indication The base station operations module 182 may provide the benefit of performing PDCCH candidate search and monitoring efficiently. The base station operations module 182 may provide information 190 to the one or more receivers 178. For example, the base station operations module 182 may inform the receiver(s) 178 when or when not to receive transmissions based on the RRC message (e.g., broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters and transmit the RRC message to a UE. A UE may receive, from a base station, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

Figure 2:
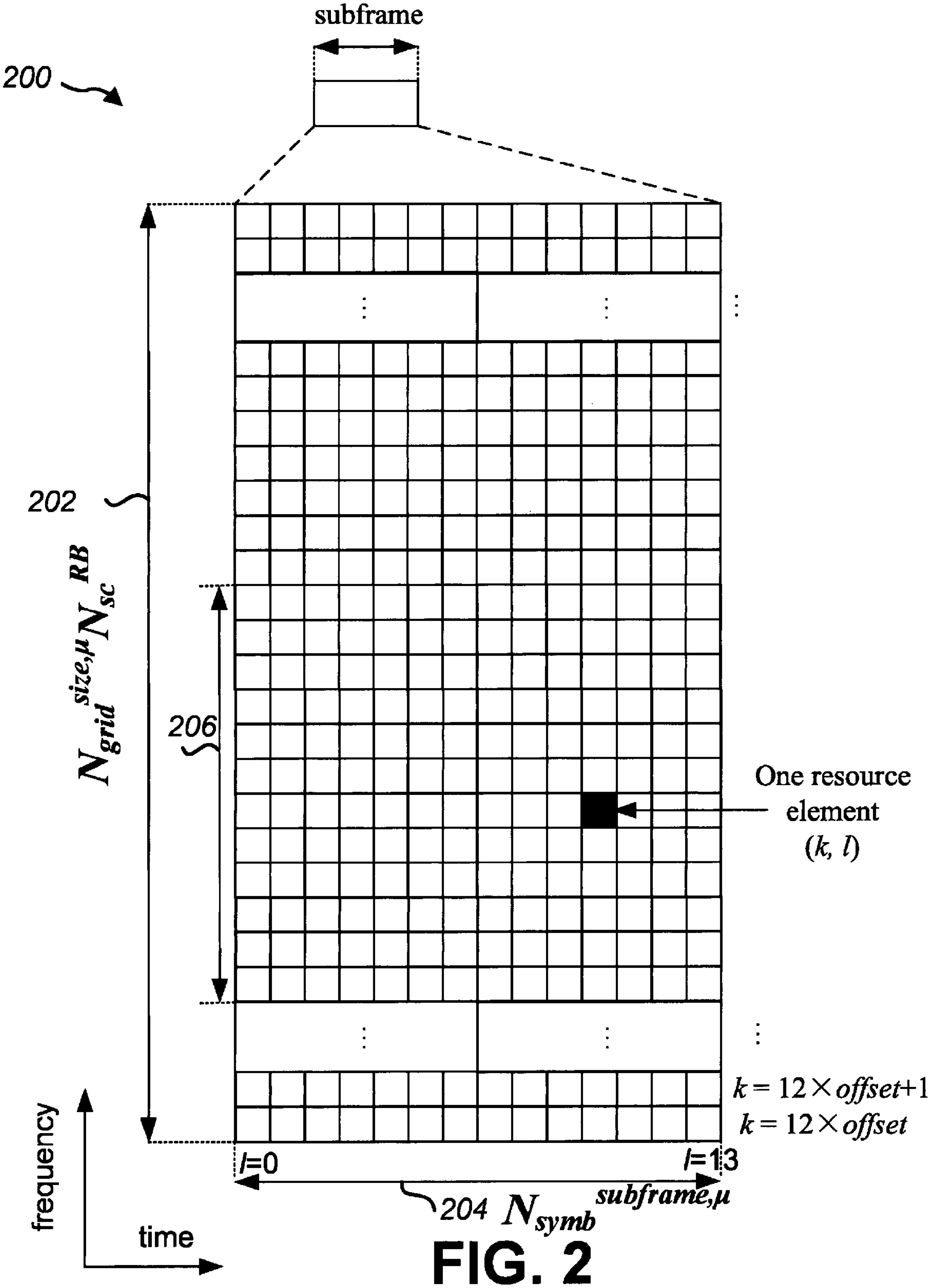
FIG. 2 is a diagram illustrating one example 200 of a resource grid.

FIG. 2 is a diagram illustrating one example of a resource grid 200.

For each numerology and carrier, a resource grid of $N_{grid,x}^{size,\mu} N_{sc}^{RB}$ subcarriers and $N_{symb}^{subframe,\mu}$ OFDM symbols is defined, starting at common resource block $N_{grid}^{start,\mu}$ indicated by higher layer signaling. There is one set of resource grids per transmission direction (uplink or downlink) with the subscript x set to DL and UL for downlink and uplink, respectively. There is one resource grid for a given antenna port p, subcarrier spacing configuration μ, and the transmission direction (downlink or uplink). When there is no risk for confusion, the subscript x may be dropped.

In the FIG. 2, the resource gird 200 includes the $N_{grid,x}^{size,\mu} N_{sc}^{RB}$ (202) subcarriers in the frequency domain and includes $N_{symb}^{subframe,\mu}$ (204) symbols in the time domain. In the FIG. 2, as an example for illustration, the subcarrier spacing configuration μ is set to 0. That is, in the FIG. 2, the number of consecutive OFDM symbols $N_{symb}^{subframe,\mu}$ (204) per subframe is equal to 14.

The carrier bandwidth $N_{grid}^{size,\mu}$ ($N_{grid,x}^{size,\mu}$) for subcarrier spacing configuration u is given by the higher-layer (RRC) parameter carrierBandwidth in the SCS-SpecificCarrier IE. The starting position $N_{grid}^{start,\mu}$ for subcarrier spacing configuration μ is given by the higher-layer parameter offsetToCarrier in the SCS-SpecificCarrier IE. The frequency location of a subcarrier refers to the center frequency of that subcarrier.

In the FIG. 2, for example, a value of offset is provided by the higher-layer parameter offsetToCarrier. That is, k=12×offset is the lowest usable subcarrier on this carrier.

Each element in the resource grid for antenna port p and subcarrier spacing configuration μ is called a resource element and is uniquely identified by $(k, l)_{p,\mu}$ where k is the index in the frequency domain and l refers to the symbols position in the time domain relative to same reference point. The resource element consists of one subcarrier during one OFDM symbol.

A resource block is defined as $N_{sc}^{RB}$=12 consecutive subcarriers in the frequency domain. As shown in the FIG. 2, a resource block 206 includes 12 consecutive subcarriers in the frequency domain. Resource block can be classified as common resource block (CRB) and physical resource block (PRB).

Common resource blocks are numbered from 0 and upwards in the frequency domain for subcarrier spacing configuration μ. The center of subcarrier 0 of common resource block with index 0 (i.e. CRB0) for subcarrier spacing configuration μ coincides with point A. The relation between the common resource block number $$n_{CRB}^{\mu}$$

in the frequency domain and resource element (k, l) for subcarrier spacing configuration μ is given by Formula (1) $n_{CRB}^{\mu}$=floor(k/$N_{sc}^{RB}$) where k is defined relative to the point A such that k=0 corresponds to the subcarrier centered around the point A. The function floor(A) hereinafter is to output a maximum integer not larger than the A.

Point A refers to as a common reference point. Point A coincides with subcarrier 0 (i.e. k=0) of a CRB 0 for all subcarrier spacing. Point A can be obtained from a RRC parameter offsetToPointA or a RRC parameter absoluteFrequencyPointA. The RRC parameter offsetToPointA is used for a PCell downlink and represents the frequency offset between point A and the lowest subcarrier of the lowest resource block, which has the subcarrier spacing provided by a higher-layer parameter subCarrierSpacingCommon and overlaps with the SS/PBCH block used by the UE for initial cell selection, expressed in units of resource blocks assuming 15 kHz subcarrier spacing for frequency range (FR) 1 and 60 kHz subcarrier spacing for frequency range (FR2). FR1 corresponds to a frequency range between 410 MHz and 7125 MHz. FR2 corresponds to a frequency range between 24250 MHz and 52600 MHz. The RRC parameter absolute FrequencyPointA is used for all cased other than the PCell case and represents the frequency-location of point A expressed as in ARFCN. The frequency location of point A can be the lowest subcarrier of the carrier bandwidth (or the actual carrier). Additionally, point A may be located outside the carrier bandwidth (or the actual carrier).

As above mentioned, the information element (IE) SCS-SpecificCarrier provides parameters determining the location and width of the carrier bandwidth or the actual carrier. That is, a carrier (or a carrier bandwidth, or an actual carrier) is determined (identified, or defined) at least by a RRC parameter offsetToCarrier, a RRC parameter subcarrierSpacing, and a RRC parameter carrierBandwidth in the SCS-SpecificCarrier IE.

The subcarrierSpacing indicates (or defines) a subcarrier spacing of the carrier. The offsetToCarrier indicates an offset in frequency domain between point A and a lowest usable subcarrier on this carrier in number of resource blocks (e.g. CRBs) using the subcarrier spacing defined for the carrier. The carrierBandwidth indicates width of this carrier in number of resource blocks (e.g. CRBs or PRBs) using the subcarrier spacing defined for the carrier. A carrier includes at most 275 resource blocks.

Physical resource block for subcarrier spacing configuration μ are defined within a bandwidth part and numbered form 0 to $N_{BWP,i}^{size,\mu}$ where i is the number of the bandwidth part. The relation between the physical resource block $n_{PRB}^{\mu}$ in bandwidth part (BWP) i and the common resource block $n_{CRB}^{\mu}$ is given by Formula (2) $n_{CRB}^{\mu}=n_{PRB}^{\mu}+N_{BWP,i}^{start,\mu}$ where $N_{BWP,i}^{start,\mu}$ is the common resource block where bandwidth part i starts relative to common resource block 0 (CRB0). When there is no risk for confusion the index μ may be dropped.

A BWP is a subset of contiguous common resource block for a given subcarrier spacing configuration μ on a given carrier. To be specific, a BWP can be identified (or defined) at least by a subcarrier spacing μ indicated by the RRC parameter subcarrierSpacing, a cyclic prefix determined by the RRC parameter cyclicPrefix, a frequency domain location, a bandwidth, an BWP index indicated by bwp-Id and so on. The locationAndBandwidth can be used to indicate the frequency domain location and bandwidth of a BWP. The value indicated by the locationAndBandwidth is interpreted as resource indicator value (RIV) corresponding to an offset (a starting resource block) $RB_{start}$ and a length $L_{RB}$ in terms of contiguously resource blocks. The offset $RB_{start}$ is a number of CRBs between the lowest CRB of the carrier and the lowest CRB of the BWP. The $N_{BWP,i}^{start,\mu}$ is given as Formula (3) $N_{BWP,i}^{start,\mu}=O_{carrier}+RB_{start}$. The value of $O_{carrier}$ is provided by offsetTocarrier for the corresponding subcarrier spacing configuration μ.

A UE 102 configured to operation in BWPs of a serving cell, is configured by higher layers for the serving cell a set of at most four BWPs in the downlink for reception. At a given time, a single downlink BWP is active. The bases station 160 may not transmit, to the UE 102, PDSCH and/or PDCCH outside the active downlink BWP. A UE 102 configured to operation in BWPs of a serving cell, is configured by higher layers for the serving cell a set of at most four BWPs for transmission. At a given time, a single uplink BWP is active. The UE 102 may not transmit, to the base station 160, PUSCH or PUCCH outside the active BWP. The specific signaling (higher layers signaling) for BWP configurations are described later.

Figure 3:
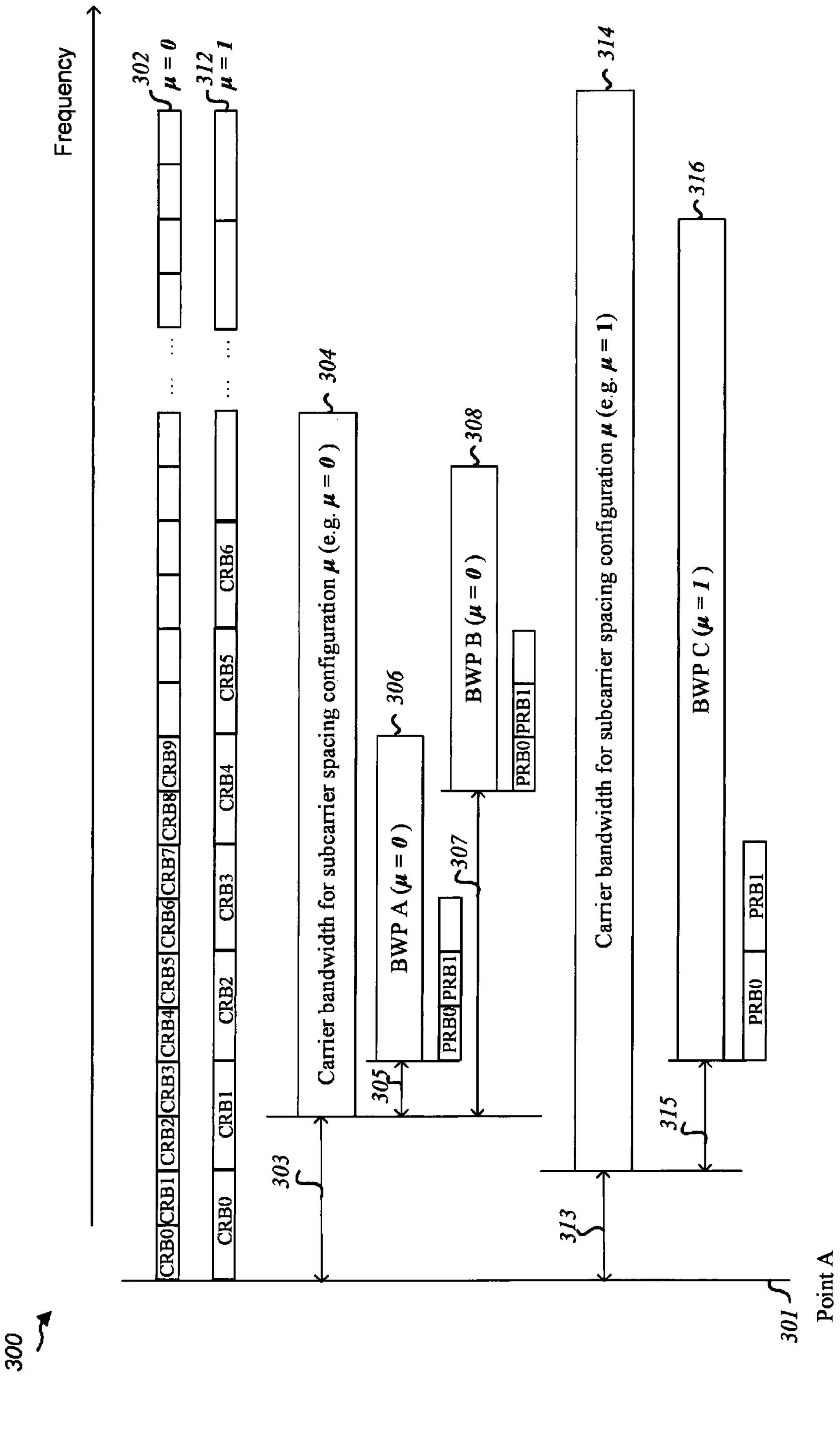
FIG. 3 is a diagram illustrating one example 300 of common resource block grid, carrier configuration and BWP configuration by a UE 102 and a base station 160.

FIG. 3 is a diagram illustrating one example 300 of common resource block grid, carrier configuration and BWP configuration by a UE 102 and a base station 160.

Point A 301 is a lowest subcarrier of a CRB0 for all subcarrier spacing configurations. The CRB grid 302 and the CRB grid 312 are corresponding to two different subcarrier spacing configurations. The CRB grid 302 is for subcarrier spacing configuration μ=0 (i.e. the subcarrier spacing with 15 kHz). The CRB grid 312 is for subcarrier spacing configuration μ=1 (i.e. the subcarrier spacing with 30 kHz).

One or more carriers are determined by respective SCS-SpecificCarrier IEs, respectively. In the FIG. 3, the carrier 304 uses the subcarrier spacing configuration μ=0. And the carrier 314 uses the subcarrier spacing configuration μ=1. The starting position $N_{grid}^{start,\mu}$ of the carrier 304 is given based on the value of an offset 303 (i.e. $O_{carrier}$) indicated by an offsetToCarrier in an SCS-SpecificCarrier IE. As shown in the FIG. 3, for example, the offsetToCarrier indicates the value of the offset 303 as $O_{carrier}$=3. That is, the starting position $N_{grid}^{start,\mu}$ of the carrier 304 corresponds to the CRB3 of the CRB grid 302 for subcarrier spacing configuration μ=0. In the meantime, the starting position $N_{grid}^{start,\mu}$ of the carrier 314 is given based on the value of an offset 313 (i.e. $O_{carrier}$) indicated by an offsetToCarrier in another SCS-SpecificCarrier IE. For example, the offsetToCarrier indicates the value of the offset 313 as $O_{carrier}$=1. That is, the starting position $N_{grid}^{start,\mu}$ of the carrier 314 corresponds to the CRB1 of the CRB grid 312 for subcarrier spacing configuration μ=1. A carrier using different subcarrier spacing configurations can occupy different frequency ranges.

As above-mentioned, a BWP is for a given subcarrier spacing configuration μ. One or more BWPs can be configured for a same subcarrier spacing configuration μ. For example, in the FIG. 3, the BWP 306 is identified at least by the μ=0, a frequency domain location, a bandwidth ($L_{RB}$), and an BWP index (index A). The first PRB (i.e. PRB0) of a BWP is determined at least by the subcarrier spacing of the BWP, an offset derived by the locationAndBandwidth and an offset indicated by the offsetToCarrier corresponding to the subcarrier spacing of the BWP. An offset 305 ($RB_{start}$) is derived as 1 by the locationAndBandwidth. According to the Formulas (2) and (3), the PRB0 of BWP 306 corresponds to CRB 4 of the CRB grid 302, and the PRB1 of BWP 306 corresponds to CRB 5 of the CRB grid 302, and so on.

Additionally, in the FIG. 3, the BWP 308 is identified at least by the μ=0, a frequency domain location, a bandwidth ($L_{RB}$), and an BWP index (index B). For example, an offset 307 ($RB_{start}$) is derived as 6 by the locationAndBandwidth.

According to the Formulas (2) and (3), the PRB0 of BWP 308 corresponds to CRB 9 of the CRB grid 302, and the PRB1 of BWP 308 corresponds to CRB 10 of the CRB grid 302, and so on.

Additionally, in the FIG. 3, the BWP 316 is identified at least by the μ=1, a frequency domain location, a bandwidth ($L_{RB}$), and an BWP index (index C). For example, an offset 315 ($RB_{start}$) is derived as 1 by the locationAndBandwidth. According to the Formulas (2) and (3), the PRB0 of BWP 316 corresponds to CRB 2 of the CRB grid 312, and the PRB1 of BWP 316 corresponds to CRB 3 of the CRB grid 312, and so on.

As shown in the FIG. 3, a carrier with the defined subcarrier spacing locate in a corresponding CRB grid with the same subcarrier spacing. A BWP with the defined subcarrier spacing locate in a corresponding CRB grid with the same subcarrier spacing as well.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCS or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH CSS set (i.e. CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets

- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI or a TC-RNTI on the primary cell
- a Type2-PDCCH CSS set configured by pagingSearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and
- a USS set configured by SearchSpace in PDCCH-Config with searchSpace Type=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configurations and/or one or more search space configurations. The information may be included in MIB and/or SIBs broadcasted by the base station. The information may be included in RRC configurations or RRC parameters. A base station may broadcast system information such as MIB, SIBs to indicate CORESET configuration(s) or search space configuration(s) to a UE. Or the base station may transmit a RRC message including one or more RRC parameters related to CORESET configuration(s) and/or search space configuration(s) to a UE.

An illustration of search space set configuration is described below.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH (MIB) or ServingCell.

Additionally, a RRC parameter SearchSpace is used to define how/where to search for PDCCH candidates. The RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter serchSpaceId provide a search space set index s, 0<=s<40. Then a search space s hereinafter may refer to a search space identified by index s indicated by RRC parameter searchSpaceId. The above-mentioned searchSpaceSIB1, searchSpaceOtherSystemInformation, ra-SearchSpace, and pagingSearchSpace indicate respective index of a search space (i.e. searchSpaceId) so that corresponding search space configuration can be determined.

The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol(s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for. The RRC parameter ue-Specific may further include a new RRC parameter (e.g. dci-FormatsExt) in addition to the dci-Formats. The RRC parameter dci-FormatsExt indicates to monitor PDCCH candidates for DCI format 0_2 and DCI format 1_2, or for DCI format 0_1, DCI format 1_1, DCI format 0_2 and DCI format 1_2. If the RRC parameter dci-FormatsExt is included in the RRC parameter ue-Specific, the UE may ignore the RRC parameter dci-Formats. That is to say, the UE may not monitor the PDCCH candidates for DCI formats indicated by the RRC parameter dci-Format and may monitor the PDCCH candidates for DCI formats indicated by the RRC parameter dci-FormatsExt.

The UE 102 may monitor PDCCH candidates for DCI format 0_0 and/or DCI format 1_0 in either a CSS or a USS. The UE 102 may monitor PDCCH candidates for DCI format 0_1, DCI format 1_1, DCI format 0_2 and/or DCI format 1_2 only in a USS but cannot monitor PDCCH candidates for DCI format 0_1, DCI format 1_1, DCI format 0_2, and/or DCI format 1_2 in a CSS. The DCI format 0_1 may schedule up to two transport blocks for one PUSCH while the DCI format 0_2 may only schedule one transport blocks for one PUSCH. DCI format 0_2 may not consist of some fields (e.g. 'CBG transmission information' field), which may be present in DCI format 0_1. Similarly, the DCI format 1_1 may schedule up to two transport blocks for one PDSCH while the DCI format 1_2 may only schedule one transport blocks for one PDSCH. DCI format 1_2 may not consist of some fields (e.g., 'CBG transmission information' field), which may be present in DCI format 1_1. The DCI format 1_2 and DCI format 1_1 may consist of one or more same DCI fields (e.g., 'antenna port' field).

The base station 160 may schedule a UE 102 to receive PDSCH by a downlink control information (DCI). A DCI format provides DCI and includes one or more DCI fields. The one or more DCI fields in a DCI format are mapped to the information bits. As above-mentioned, the UE 102 can be configured by the base station 160 one or more search space sets to monitor PDCCH for detecting corresponding DCI formats. If the UE 102 detects a DCI format (e.g., the DCI format 1_0, the DCI format 1_1, or the DCI format 1_2) in a PDCCH, the UE 102 may be scheduled by the DCI format to receive a PDSCH.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

Herein, 'a UE monitor PDCCH for a search space set s' also refers to 'a UE may monitor a set of PDCCH candidates of the search space set s'. Alternatively, 'a UE monitor PDCCH for a search space set s' also refers to 'a UE may attempt to decode each PDCCH candidate of the search space set s according to the monitored DCI formats'. As above-mentioned, the PDCCH is used for transmitting or carrying Downlink Control Information (DCI). Thus, 'PDCCH', 'DCI', 'DCI format', and/or 'PDCCH candidate' are virtually interchangeable. In other words, 'a UE monitors PDCCH' implies 'a UE monitors PDCCH for a DCI format'. That is, 'a UE monitors PDCCH' implies 'a UE monitors PDCCH for detection of a configured DCI format'.

In the present disclosure, the term "PDCCH search space sets" may also refer to "PDCCH search space". A UE monitors PDCCH candidates in one or more of search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH (PBCH). A RRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSetId, frequencyDomainResource, duration, cce-REG-MappingType, precoderGranularity, tci-PresentIn-DCI, pdcch-DMRS-ScramblingID and so on.

Here, the RRC parameter ControlResourceSetId is an CORESET index p, used to identify a CORESET within a serving cell, where $0<p<12$. The RRC parameter duration indicates a number of consecutive symbols of the CORESET $N_{symb}^{CORESET}$, which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{CORESET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. The first common RB of the first RB group has common RB index 6×ceiling ($N_{BWP}^{start}/6$). A bit that is set to 1 indicates that this RB group belongs to the frequency domain resource of this CORESET. Bits corresponding to a group of RBs not fully contained in the bandwidth part within which the CORESET is configured are set to zero. The ceiling (A) function hereinafter is to output a smallest integer not less than A.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consists of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG mapping are supported in a CORESET. Each resource element group carrying PDCCH carries its own DMRS.

Figure 4:
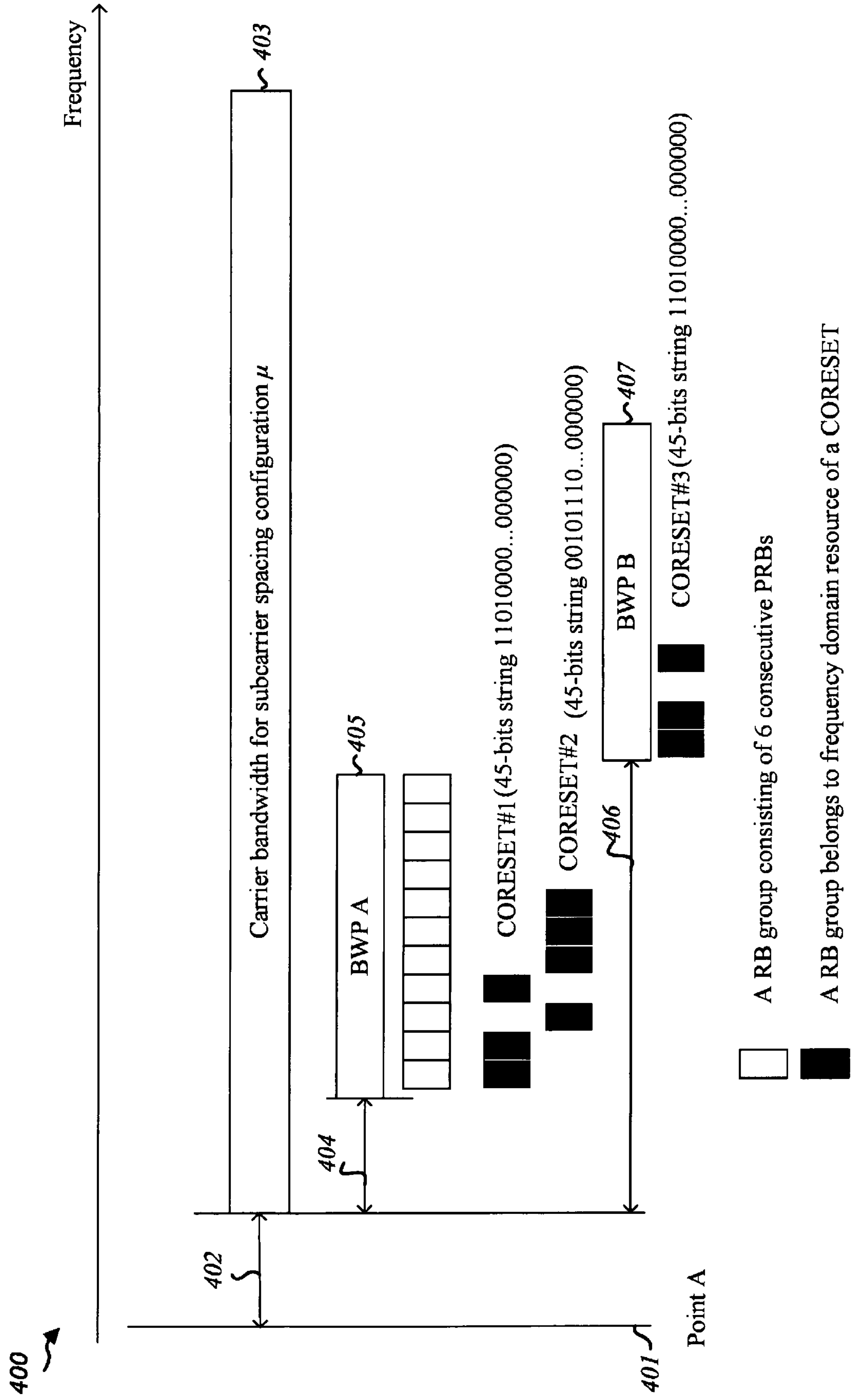
FIG. 4 is a diagram illustrating one 400 example of CORESET configuration in a BWP by a UE 102 and a base station 160.

FIG. 4 is a diagram illustrating one 400 example of CORESET configuration in a BWP by a UE 102 and a base station 160.

FIG. 4 illustrates that a UE 102 is configured with three CORESETs for receiving PDCCH transmission in two BWPs. In the FIG. 4, 401 represent point A. 402 is an offset in frequency domain between point A 401 and a lowest usable subcarrier on the carrier 403 in number of CRBs, and the offset 402 is given by the offsetToCarrier in the SCS-SpecificCarrier IE. The BWP 405 with index A and the carrier 403 are for a same subcarrier spacing configuration μ. The offset 404 between the lowest CRB of the carrier and the lowest CRB of the BWP in number of RBs is given by the locationAndBandwidth included in the BWP configuration for BWP A. The BWP 407 with index B and the carrier 403 are for a same subcarrier spacing configuration μ. The offset 406 between the lowest CRB of the carrier and the lowest CRB of the BWP in number of RBs is given by the locationAndBandwidth included in the BWP configuration for BWP B.

For the BWP 405, two CORESETs are configured. As above-mentioned, a RRC parameter frequencyDomainResource in respective CORESET configuration indicates the frequency domain resource for respective CORESET. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #1. That is, the first RB group, the second RB group, and the fourth RB group belong to the frequency domain resource of the CORESET #1. Additionally, the RRC parameter frequencyDomainResource provides a bit string with a fixed size (e.g. 45 bits) as like '00101110 . . . 000000' for CORESET #2. That is, the third RB group, the fifth RB group, the sixth RB group and the seventh RB group belong to the frequency domain resource of the CORESET #2.

For the BWP 407, one CORESET is configured. As above-mentioned, a RRC parameter frequencyDomainResource in the CORESET configuration indicates the frequency domain resource for the CORESET #3. In the frequency domain, a CORESET is defined in multiples of RB groups and each RB group consists of 6 RBs. For example, in the FIG. 4, the RRC parameter frequencyDomainResource provides a bit string with a fixed size (e.g. 45 bits) as like '11010000 . . . 000000' for CORESET #3. That is, the first RB group, the second RB group, and the fourth RB group belong to the frequency domain resource of the CORESET #3. Although the bit string configured for CORESET #3 is same as that for CORESET #1, the first RB group of the BWP B is different from that of the BWP A in the carrier. Therefore, the frequency domain resource of the CORESET #3 in the carrier is different from that of the CORESET #1 as well.

FIG. 5 is a diagram illustrating one example 500-1 of REG numbering and one example 500-2 of CCE resource numbering for a CORESET.

The UE 102 may monitor a set of PDCCH candidates for a search space set in a CORESET p which consist of a set of $N_{RB}^{CORESET}$ PRBs and one sets of $N_{symb}^{CORESET}$ consecutive OFDM symbols. The resource blocks $N_{RB}^{CORESET}$ PRBs configured for the CORESET can be contiguous or can be not contiguous in the frequency domain. For the CORESET, the REGs within the CORESET are numbered in increasing order in time-first manner, starting with 0 for the first OFDM symbol and the lowest-numbered resource block in the CORESET. In FIG. 5A, REGs within the CORESET are numbered in increasing order in time-first manner, starting with 0 for the first OFDM symbol and the lowest-numbered resource block in the 502. The REGs within the CORESET 502 are numbered by 0 to 35 by the time-first manner. The REGs for different PDCCH monitoring occasion in a same CORESET are numbered by the same way. That is, one or more PDCCH monitoring occasions in a same CORESET may have same REG mapping.

Figure 5B:
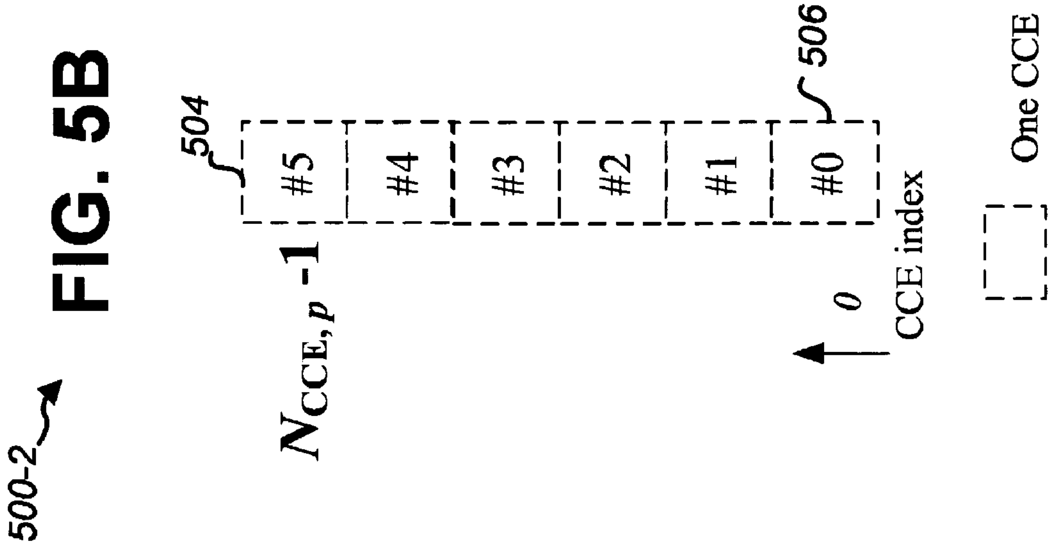
FIG. 5 is a diagram illustrating one example 500-1 of REG numbering and one example 500-2 of CCE resource numbering for a CORESET.
Figure 5A:
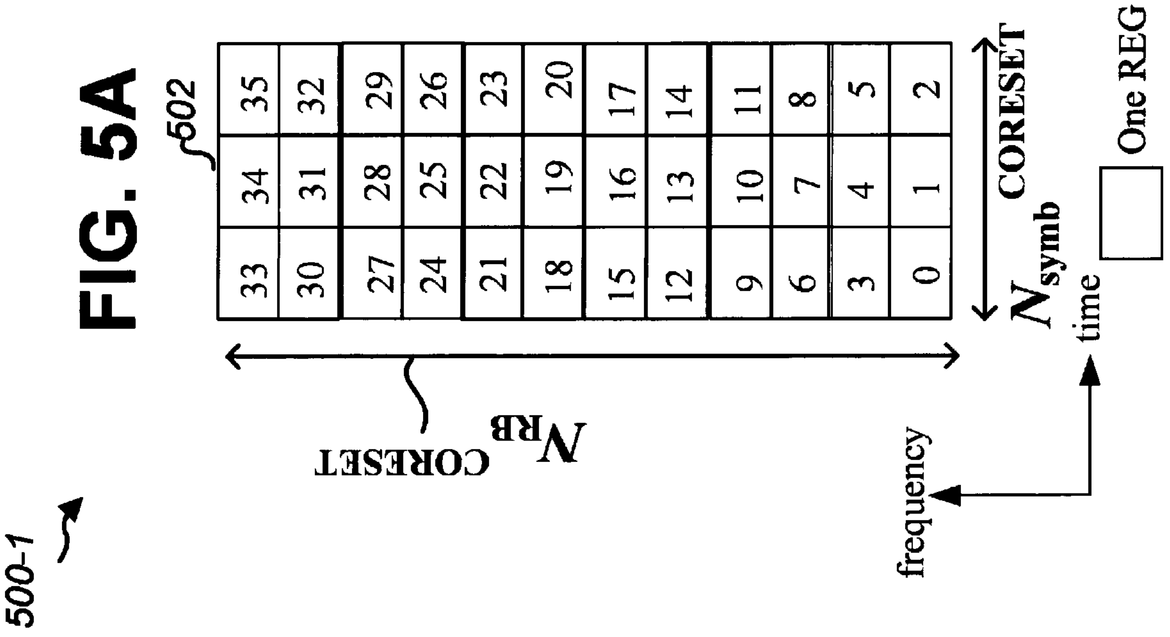

In FIG. 5B, $N_{CCE,p}$ is the number of CCEs, numbered from 0 to ($N_{CCE,p}$−1), in the CORESET. The CORESET herein comprises of 6 CCEs. According to the CCE-to-REG mapping, UE 102 may determine a CCE comprising of which corresponding REGs. For non-interleaved CCE-to-REG mapping, all CCEs for a DCI with AL L are mapped in consecutive REG bundles of the CORESET. For example, for non-interleaved CCE-to-REG mapping, a CCE with index 0 (CCE #0) 506 comprises of 6 consecutive REGs with 0, 1, 2, 3, 4, 5. For interleaved CCE-to-REG mapping, REG bundles constituting the CCEs for a PDCCH are distributed in the frequency domain in units of REG bundles. A REG bundle i is defined as REGs {i*B, i*B+1, . . . , i*B+B−1} where B is the REG bundle size indicated by the base station.

The UE 102 can determine the CCE indexes for aggregation level L corresponding to PDCCH candidates of a USS for a USS set based on the value of C-RNTI addressed to the UE. The UE 102 can determine the CCE indexes for aggregation level L corresponding to PDCCH candidates of a CSS for a CSS set without the value of C-RNTI addressed to the UE.

To be more specific, for a search space set s associated with CORESET p, the CCE indexes for aggregation level L corresponding to PDCCH candidate $m_{s,n\_CI}$ of the search space set in slot n for an active DL BWP of a serving cell corresponding to carrier indicator field value, CIF value, n_CI are given by Formula (4) $L*((Y_{p,n}+\text{floor}((m_{s,n\_CI}*N_{CCE,p})/(L*M_{s,max}^{(L)}))+n\_CI)\bmod(\text{floor}(N_{CCE,p}/L)))+i$. The parameters in the Formula (4) are illustrated as below: for any CSS, $Y_{p,n}$ is equal to 0, while for a USS, $Y_{p,n}=(A_p*Y_{p,n-1})\bmod D$ where $Y_{p,-1}=n_{RNTI}\neq 0$, $A_p=39827$ for p mod 3=0, $A_p=39829$ for p mod 3=1, $A_p=39839$ for p mod 3=2, and D=65537; slot n can be denoted by $n^u_{s,f}$ representing the slot number within a radio frame with respect to the SCS configuration u; i=0, . . . , L−1; $N_{CCE,p}$ is the number of CCEs, numbered from 0 to ($N_{CCE,p}$−1), in CORESET p; $n_{RNTI}$ is an value of C-RNTI provided by the base station for the UE; n_CI is the carrier indicator field value if the UE 102 is configured with a carrier indicator field for the serving cell on which PDCCH is monitored; otherwise, including for any CSS, the n_CI is equal to 0; $m_{s,n\_CI}=0, \ldots, M_{s,n\_CI}^{(L)}-1$, where $M_{s,n\_CI}^{(L)}$ is the number of PDCCH candidates the UE is configured to monitor for aggregation level L of the search space set s for a serving cell corresponding to n_CI; for any CSS, $M_{s,max}^{(L)}=M_{s,0}^{(L)}$; for a USS, $M_{s,max}^{(L)}$ is the maximum of $M_{s,n\_CI}^{(L)}$ over all configured n_CI values for a CCE aggregation level L of search space set s. $m_{s,n\_CI}$ is an index of a PDCCH candidate the UE configured to monitor per aggregation level L of the search space set s.

Here, in a CORESET associated with a search space set s, a set of CCEs for AL L are those determining CCE indexes where the PDCCH candidates, the UE 102 is configured to monitor for AL L of the search space set, are placed. Here, a set of CCEs for AL L can also refer to a USS. That is, a search space set s may comprise of one or more corresponding sets of CCEs for respective AL L. A set of CCEs can also refer to as 'a USS'. A set of CCEs for AL L can also refer to 'a USS at AL L'.

As above-mentioned, the UE 102 may receive, from the base station 160, a RRC message including one or more RRC parameters related to search space configuration. The UE 102 may determine PDCCH monitoring occasions for PDCCH candidates for each search space set s based on the received the RRC parameters. The UE 102 may monitor PDCCH candidates for each search space set s in the determined PDCCH monitoring occasions. For example, a RRC parameter (e.g. SearchSpace) may provide the UE 102 for a search space set s, that a PDCCH monitoring periodicity of $k_s$ slots, a PDCCH monitoring offset of $o_s$ slots, a duration of $T_s$, a PDCCH monitoring pattern within a slot, and so on.

Figure 6:
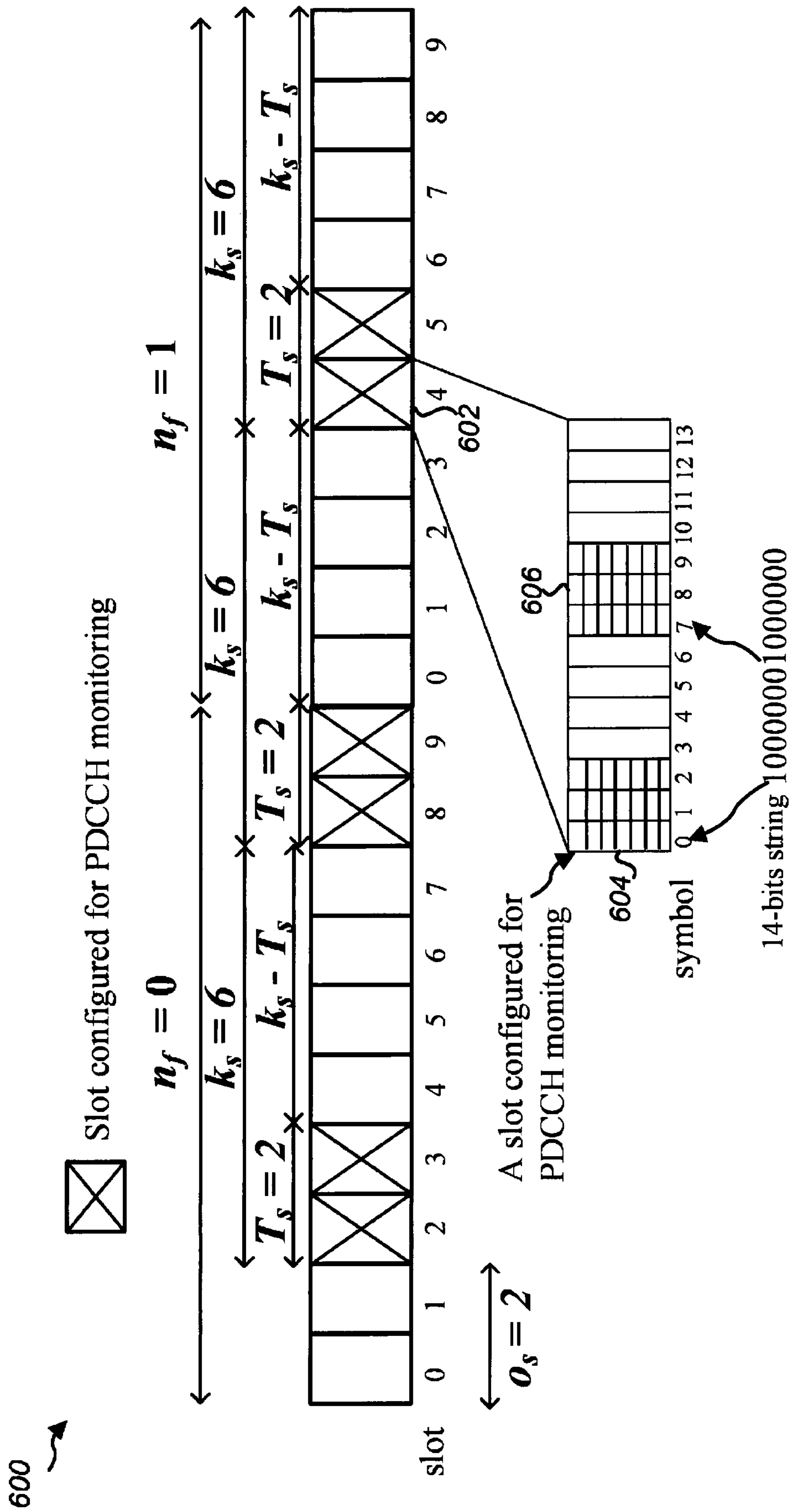
FIG. 6 is a diagram illustrating one example 600 how to determine PDCCH monitoring occasions for PDCCH candidates based on corresponding search space set configuration and CORESET configuration.

In order to monitor a set of PDCCH candidates of a search space set, the UE may determine PDCCH monitoring occasions according to the search space set configuration and associated CORESET configuration. FIG. 6 is a diagram illustrating one example 600 how to determine PDCCH monitoring occasions for PDCCH candidates based on corresponding search space set configuration and CORESET configuration.

In FIG. 6, the PDCCH monitoring periodicity $k_s$ is configured as 6 slots. The PDCCH monitoring offset $o_s$ is configured as 2 slots. The duration $T_s$ is configured as 2 slots. The subcarrier spacing configuration u is configured as 0, which means the subcarrier spacing of the active DL BWP is 15 kHz. In this case u=0, $N^{frame,u}_{slot}$ is equal to 10. That is, in a case u=0, the number of slots per frame is $10 \cdot n^{u}_{s,f}$ is the slot number within a radio frame. That is, the value of $n^{u}_{s,f}$ is in a range of $\{0, \ldots, N^{frame,u}_{slot}-1\}$.

The UE 102 may determine a PDCCH monitoring occasion on an active DL BWP from the PDCCH monitoring periodicity, the PDCCH monitoring offset, and the PDCCH monitoring pattern within a slot for each configured search space set s. For a search space set s, the UE 102, if the slot with number $n^{u}_{s,f}$ satisfies Formula (5) $(n_f * N^{frame,u}_{slot} + n^{u}_{s,f} - o_s) \bmod k_s = 0$, may determine that a PDCCH monitoring occasion(s) exists in a slot with number $n^{u}_{s,f}$ in a frame with number $n_f$. According to Formula (5), the UE 102 may determine the slots with number $n^{u}_{s,f}=2$ and $n^{u}_{s,f}=8$ in a frame with number $n_f=0$ and the slot with number $n^{u}_{s,f}=4$ in a frame with number $n_f=1$ as the slots in which the PDCCH monitoring occasions exists. Given the $T_s$ is configured as 2 slots, the UE 102 may monitor PDCCH candidates for search space set s for $T_s=2$ consecutive slots, staring from the determined the slots with number $n^{u}_{s,f}$. In other words, the UE 102 may not monitor PDCCH candidates for search space set s for the next $(k_s-T_s)$ consecutive slots. As depicted in FIG. 6, the UE 102 may determine the slots with number $n^{u}_{s,f}=2$, 3, 8, and 9 in a frame with number $n_f=0$ and the slots with number $n^{u}_{s,f}=4$, and 5 in a frame with number $n_f=1$ as the slots having PDCCH monitoring occasions. The UE 102 may monitor PDCCH candidates for search space set s in the determined slots configured for PDCCH monitoring. A slot having PDCCH monitoring occasions may also refer to a slot configured for PDCCH monitoring.

Furthermore, a slot determined (or configured) for PDCCH monitoring may have one or more than one PDCCH monitoring occasions. PDCCH monitoring pattern within the slot configured for PDCCH monitoring is indicated by a 14-bits string (monitoringSymbolsWithinSlot). Each bit within the 14-bits string may correspond to a symbol within a slot, respectively. The most significant (left) bit (MSB) may represent the first OFDM in a slot, and the second most significant (left) bit may represent the second OFDM symbol in a slot and so on. The bit(s) set to one may identify the first OFDM symbol(s) of the control resource set within a slot. As depicted in FIG. 6, a slot 602 configured for PDCCH monitoring may have two PDCCH monitoring occasions. The first PDCCH monitoring occasion 604 is located on the first, second and third consecutive symbols. The second PDCCH monitoring occasion 606 is located on the $8^{th}$, $9^{th}$, and $10^{th}$ consecutive OFDM symbols. The duration of one PDCCH monitoring occasion is equal to the duration of a CORESET associated with the search space set s. Generally, the duration of one PDCCH monitoring occasion (the number of the consecutive OFDM symbols for one PDCCH monitoring occasion) can be 1, 2 or 3 symbols. In the FIG. 6, a CORESET comprises one PDCCH monitoring occasion with 3 consecutive ODM symbols in the time domain.

According to the FIG. 6, the UE may monitor a set of PDCCH candidates for the search space set s in the first PDCCH monitoring occasion 604 in the associated CORESET and may further monitor a set of PDCCH candidates for the search space set s in the second PDCCH monitoring occasion 606 in the CORESET in each slot in which the PDCCH monitoring is configured for the search space set s. Here, each PDCCH candidate for the search space set s is mapped in a resource of the associated CORESET in each PDCCH monitoring occasion. In other words, one PDCCH candidate for the search space set s is mapped to one associated CORESET in one PDCCH monitoring occasion. One PDCCH candidate for the search space set s is not mapped to more than one associated CORESET in different PDCCH monitoring occasions. For example, one PDCCH candidate for the search space set s is not mapped to both the first PDCCH monitoring occasion 604 and the second PDCCH monitoring occasion 606.

In the present disclosure, the UE 102 may have three RRC states (RRC modes), i.e., RRC_IDLE, RRC_INACTIVE, RRC_CONNECTED. RRC states can be also called as mobility states. Three RRC states is helpful to efficiently manage the power consumption of the UE 102. The UE 102 in RRC_CONNECTED state may need to constantly monitor control channel for data transmission and reception. Therefore, unless there is data required to be transmitted between the UE 102 and the base station 160, it is not necessary for the UE 102 to be always in RRC_CONNECTED state. In this case, the UE 102 can be either in RRC_IDLE or in RRC_INACTIVE to at least save some power consumption. However, the UE 102 has only one RRC state at one time.

To establish a RRC connection with a base station (or network), the UE 102 may initiate a random access procedure. When the RRC connection has been established, the UE 102 is either in RRC_CONNECTED state or in RRC_INACTIVE state. In other words, when the RRC connection has been established but suspended, the UE 102 is in RRC_INACTIVE state. When the RRC connection has been established but not suspended, the UE 102 is in RRC_CONNECTED state. On the contrary, if no RRC connection is established, the UE 102 is in RRC_IDLE state.

In NR Release 15/16, the maximum bandwidth that NR Release 15/16 UEs (i.e. legacy UEs) can support are up to 100 MHz for FR1 and 200 MHz for FR2. Compared with the Release 15/16 UEs, cost reduction for a new UE type (e.g., wearable devices, industrial sensors, video surveillance) is desirable. To reduce the cost and the complexity, the UE with new type would be equipped with less reception antennas and/or the reduced bandwidth (i.e. RF bandwidth and/or baseband bandwidth) relative to the NR Release 15/16 UEs. The reduced reception antennas would result in a reduced power for the received channels/signals. The reduced bandwidth would also result in a reduced frequency diversity. The maximum bandwidth that UEs with reduced bandwidth can support may be, for example, 20 MHz for FR1 and 100 MHz for FR2. This kind of UEs can be termed 'RedCap (reduced capability) UEs'. The NR Release 15/16 UEs can be termed 'non-RedCap UEs'. Additionally, UEs other than RedCap UEs can be termed 'non-RedCap UEs'. Unless otherwise specified, a UE 102 hereinafter in the present disclosure may refer to the RedCap UEs with reduced bandwidth including reduced RF bandwidth and/or reduced baseband bandwidth. That is, the maximum bandwidth the UE 102 can support may be 20 MHz for FR1 and may be 100 MHz for FR2.

In a serving cell, the base station may configure BWPs (DL BWPs and/or UL BWPs) with different bandwidths and different frequency locations for different UEs. For a UE, a configurable bandwidth of a BWP (a DL BWP and/or a UL BWP) is subject to the UE's bandwidth capability, i.e. the maximum bandwidth the UE can support. The base station may not configure a UE with a BWP whose bandwidth is wider than the maximum bandwidth the UE can support. The UE may not operate with a BWP whose bandwidth is wider than the maximum bandwidth the UE can support. In a serving cell, due to different bandwidth capabilities of different UEs, for example, the base station may configure a non-RedCap UE with a BWP whose bandwidth can be up to 100 MHz and may configure a RedCap UE with a BWP whose bandwidth can be up to 20 MHz.

In the present disclosure, as above-mentioned, the RRC parameter initialDownlinkBWP may indicate the initial downlink BWP configuration for a serving cell (e.g., a SpCell and Scell) while the RRC parameter initialUplinkBWP may indicate the initial UL BWP configuration for a serving cell (e.g., a SpCell and Scell). The base station may transmit initialDownlinkBWP and/or initialUplinkBWP which may be included in SIB1, RRC parameter ServingCellConfigCommon, or RRC parameter ServingCellConfig to the UE. The RRC parameters initialDownlinkBWP included in the SIB1 is used to indicate the initial downlink BWP configuration for a primary cell. The RRC parameters initialUplinkBWP included in the SIB1 is used to indicate the initial UL BWP configuration for a primary cell. Additionally or alternatively, RRC parameters initialDownlinkBWP-redCap and initialUplinkBWP-redCap may be included in the SIB1 as well. The initialDownlinkBWP-redCap can be used to indicate the initial Downlink BWP configuration for a primary cell. The initialDownlinkBWP-redCap provides the initial Downlink BWP configuration specific to RedCap UEs for a primary cell. initialDownlinkBWP and initialDownlinkBWP-redCap may include generic parameters (e.g. locationAndBandwidth, subcarrierSpacing, cyclicPrefix) of the initial Downlink BWP, cell specific parameters (e.g. pdcch-ConfigCommon) for PDCCH of the initial downlink BWP, cell specific parameters (e.g. pdsch-ConfigCommon) for the PDSCH of the initial downlink BWP.

For operation on the primary cell, the base station 160 may configure a UE 102 with an initial downlink BWP according to the initialDownlinkBWP and/or initialDownlinkBWP-redCap. For operation on the primary cell, a UE 102 is provided an initial Downlink BWP by initialDownlinkBWP-redCap, if the initialDownlinkBWP-redCap is configured (or is provided); Otherwise, the UE 102 is provided an initial UL BWP by initialDownlinkBWP. To be specific, for operation on the primary cell, in a case that the SIB1 includes the initialDownlinkBWP-redCap, the UE 102 is provided an initial Downlink BWP by the initialDownlinkBWP-redCap. In this case, the UE 102 may ignore the RRC parameter initialDownlinkBWP included in the SIB1 and may apply initialDownlinkBWP-redCap to determine the initial Downlink BWP. In other words, in a case that SIB1 includes the initialDownlinkBWP-redCap, the UE 102 (i.e. RedCap UEs) may determine an initial Downlink BWP based on the initialDownlinkBWP-redCap and may determine the initial Downlink BWP not based on the initialDownlinkBWP. Non-RedCap UEs may determine the initial Downlink BWP based on the initialDownlinkBWP. That is, the base station 160 may configure an initial Downlink BWP for non-RedCap UEs and configure another initial Downlink BWP for RedCap UEs separately from the initial Downlink BWP for non-RedCap UEs. RedCap UEs and non-RedCap UEs may not share a same Downlink BWP.

On the other hand, in a case that the SIB1 does not include the initialDownlinkBWP-redCap and includes the initialDownlinkBWP, the UE 102 is provided an initial Downlink BWP by the initialDownlinkBWP. In this case, the UE 102 may apply initialDownlinkBWP to determine the initial Downlink BWP. In other words, in a case that SIB1 does not include the initialDownlinkBWP-redCap, the UE 102 may determine an initial Downlink BWP based on the initialDownlinkBWP. On the other hand, non-Redcap UEs may apply initialDownlinkBWP to determine the initial Downlink BWP and may not apply initialDownlinkBWP-redCap to determine the initial Downlink BWP.

Therefore, the base station may configure non-RedCap UEs with an initial DL BWP A may configure RedCap UEs with an initial DL BWP B through initialDownlinkBWP and initialDownlinkBWP-redCap wherein the frequency location and bandwidth of the initial DL BWP A can be different from those of the initial DL BWP B. In the present disclosure, the bandwidth of the initial DL BWP A determined by the locationAndBandwidth included in the initial DL BWP configuration A can be larger than 20 MHz, i.e., the maximum bandwidth the RedCap UE can support. In this case, the RedCap UE may not regard the initial DL BWP A provided by the initial DL BWP configuration A as an initial DL BWP applicable to the RedCap UE itself. However, the RedCap UE may apply the RRC parameters related to the initial DL BWP configuration A, which is illustrated hereafter, for communication with base station 160.

Figure 7:
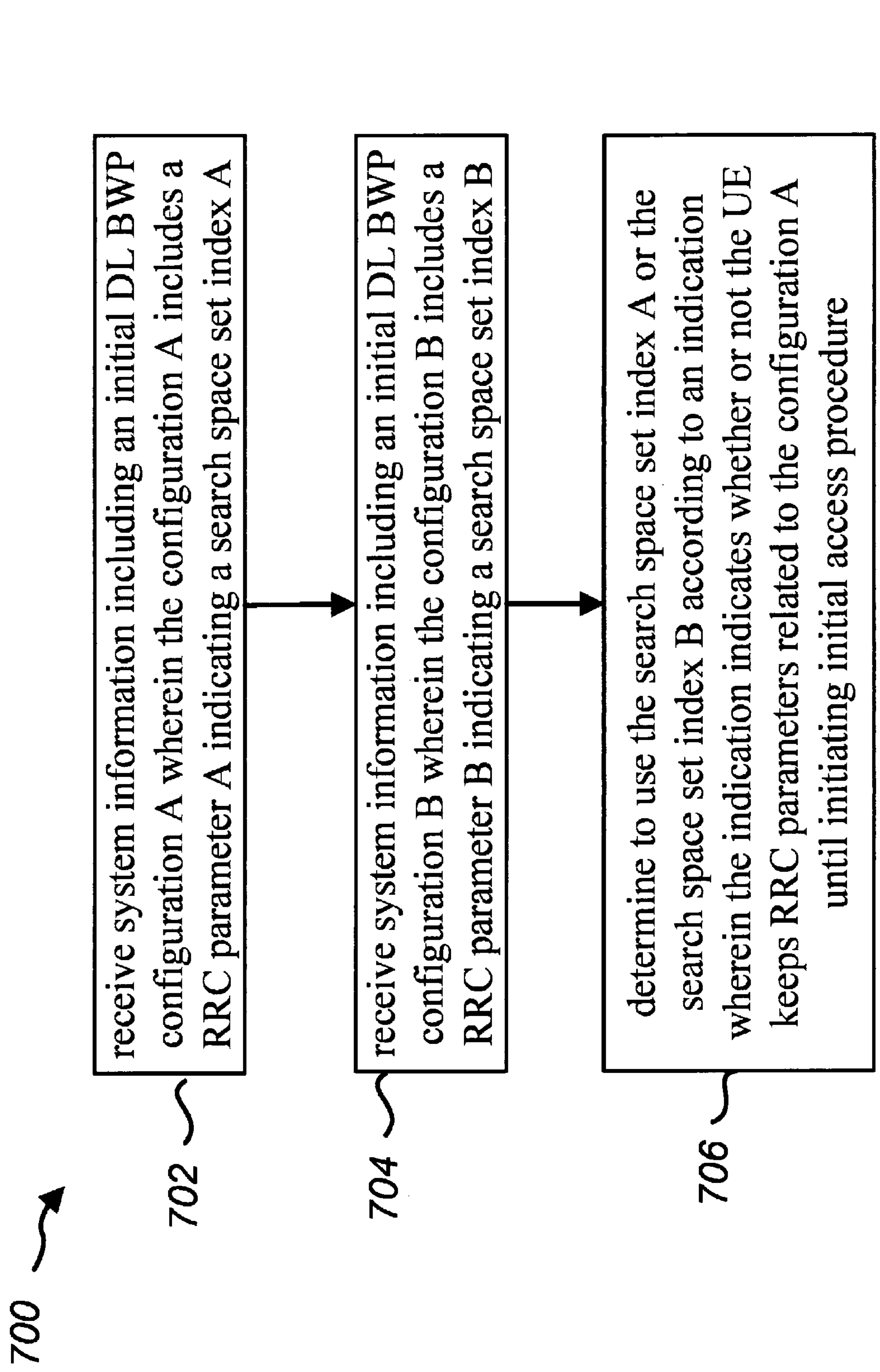
FIG. 7 is a flow diagram illustrating one implementation of a method 700 for monitoring PDCCH for CSS set(s) by a UE 102.

FIG. 7 is a flow diagram illustrating one implementation of a method 700 for monitoring PDCCH for CSS set(s) by a UE 102.

In the implementation of the present disclosure, the base station may configure an initial DL BWP configuration A and configure an initial DL BWP configuration B via system information (e.g., SIB1). The UE 102 may need to determine to apply RRC parameters in which of the two initial DL BWP configurations for monitoring PDCCH for CSS set(s). An indication included in the system information (e.g., SIB1) can be introduced for the UE 102 to determine to use RRC parameters in which of the two initial DL BWP configurations for monitoring PDCCH for CSS set(s). The UE or the UE 102 in the implementation may refer to a RedCap UE. In various implementations of the present disclosure, the system information may be the SIB1. Or the system information may be other system information broadcasted by the base station 160. (e.g., MIB or other SIBs).

The UE 102 may receive 702, from a base station 160, system information including an initial DL BWP configuration A (e.g., the above-mentioned RRC parameter initialDownlinkBWP). The initial DL BWP configuration A provides a BWP A (i.e., an initial downlink BWP A) for a PCell. The initial DL BWP configuration A may include generic parameters (e.g. locationAndBandwidth, subcarrierSpacing, cyclicPrefix) of the initial Downlink BWP A, cell specific parameters (e.g. pdcch-ConfigCommon) for PDCCH of the initial downlink BWP A, cell specific parameters (e.g. pdsch-ConfigCommon) for the PDSCH of the initial downlink BWP A. The initial DL BWP configuration A may include a RRC parameter A which indicates a search space set index A. Specifically, the RRC parameter A may be included in the pdcch-ConfigCommon in the initial DL BWP configuration A.

The UE 102 may receive 704, from a base station 160, system information including an initial DL BWP configuration B (e.g., the above-mentioned RRC parameter initialDownlinkBWP-redCap). The initial DL BWP configuration B provides a BWP B (i.e., an initial downlink BWP B) for the PCell. The initial DL BWP configuration B may include generic parameters (e.g. locationAndBandwidth, subcarrierSpacing, cyclicPrefix) of the initial Downlink BWP B, cell specific parameters (e.g. pdcch-ConfigCommon) for PDCCH of the initial downlink BWP B, cell specific parameters (e.g. pdsch-ConfigCommon) for the PDSCH of the initial downlink BWP B. The initial DL BWP configuration B may include a RRC parameter B which indicates a search space set index B. Specifically, the RRC parameter B may be included in the pdcch-ConfigCommon in the initial DL BWP configuration B.

In various implementation of the present disclosure, both the RRC parameter A and the RRC parameter B are used to indicate an index of search space set for paging. Additionally or alternatively, both the RRC parameter A and the RRC parameter B are used to indicate an index of search space set for SIB1. Additionally or alternatively, both the RRC parameter A and the RRC parameter B are used to indicate an index of search space set for other system information. However, both the RRC parameter A and the RRC parameter B are not used to indicate an index of search space set for random access procedure. In other words, the indication cannot be applied to determine how the UE 102 monitors PDCCH for random access procedure.

The UE 102 may receive, from a base station 160, system information including an indication. The indication can be included in the initial DL BWP configuration B, for example, in the pdcch-ConfigCommon of the initial DL BWP configuration B. The indication (i.e. an RRC parameter) may be used to indicate whether the UE needs to keep RRC parameters related to the initial DL BWP configuration A until initiating initial access procedure. Additionally or alternatively, the indication can be included in the initial DL BWP configuration A, for example, in the pdcch-ConfigCommon of the initial DL BWP configuration A. The indication (i.e. an RRC parameter) may be used to indicate whether the UE needs to keep RRC parameters related to the initial DL BWP configuration A until initiating initial access procedure.

In the present disclosure, initial access procedure means a random access procedure which is used to transmit the RRCSetupRequest message, the RRCResume Request message, and/or the RRCReestablishmentRequest message. The RRCSetupRequest message is used to request the establishment of an RRC connection between the UE 102 and the network (the base station 160). The RRCResumeRequest message is used to request the resumption of a suspended RRC connection or perform an RNA update. The RRCReestablishmentRequest message is used to request the reestablishment of an RRC connection.

The UE 102 and/or the base station 160 may determine 706 to use the search space set index A or the search space set index B based on the indication. In a case that the indication indicates the UE keeps RRC parameters related to the initial DL BWP configuration A until initiating initial access procedure, the UE 102 may determine to use the search space set index A until initiating initial access procedure. In this case, the UE 102 may determine to use the search space set index B upon initiating initial access procedure (i.e. during and/or after initial access procedure). In this case, the UE 102 may determine to apply the RRC parameters related to the initial DL BWP configuration A until initiating initial access procedure and may determine to apply the RRC parameters related to the initial DL BWP configuration B upon initiating initial access procedure (i.e. during and/or after initial access procedure).

In a case that the indication does not indicate the UE keeps RRC parameters related to the initial DL BWP configuration A until initiating initial access procedure, the UE 102 may determine to use the search space set index B upon reception of the RRC parameter B. In this case, the UE 102 may determine to apply the RRC parameters related to the initial DL BWP configuration B upon reception of RRC parameters related to the initial DL BWP configuration B.

Additionally or alternatively, the indication can be used to indicates whether the UE needs to keep RRC parameters related to initial DL BWP configuration A until after reception of RRCSetup message, the RRCResume message, and/or the RRCReestablishment message. The RRCSetup message is used to establish SRB1. The RRCResume message is used to resume the suspended RRC connection. The RRCReestablishment message is used to re-establish SRB1.

In a case that the indication indicates the UE keeps RRC parameters related to the initial DL BWP configuration A until after reception of RRCSetup message, the RRCResume message, and/or the RRCReestablishment message, the UE 102 may determine to use the search space set index A until after reception of RRCSetup message, the RRCResume message, and/or the RRCReestablishment message. In this case, the UE 102 may determine to use the search space set index B after reception of RRCSetup message, the RRCResume message, and/or the RRCReestablishment message. In this case, the UE 102 may determine to apply the RRC parameters related to the initial DL BWP configuration A until after reception of RRCSetup message, the RRCResume message, and/or the RRCReestablishment message and may determine to apply the RRC parameters related to the initial DL BWP configuration B after reception of RRCSetup message, the RRCResume message, and/or the RRCReestablishment message.

In a case that the indication does not indicate the UE keeps RRC parameters related to the initial DL BWP configuration A until after reception of RRCSetup message, the RRCResume message, and/or the RRCReestablishment message, the UE 102 may determine to use the search space set index B upon reception of the RRC parameter B. In this case, the UE 102 may determine to apply the RRC parameters related to the initial DL BWP configuration B upon reception of RRC parameters related to the initial DL BWP configuration B.

Additionally or alternatively, the indication can be used to indicates whether the UE needs to keep RRC parameters related to initial DL BWP configuration A until after the UE 102 is provided a C-RNTI (i.e. the UE 102 has received a C-RNTI from the base station, or the base station 160 provides a C-RNTI to the UE 102). In a case that the indication indicates the UE keeps RRC parameters related to the initial DL BWP configuration A until after the UE 102 is provided a C-RNTI, the UE 102 may determine to use the search space set index A until after the UE 102 is provided a C-RNTI. In this case, the UE 102 may determine to use the search space set index B after the UE 102 is provided a C-RNTI. In this case, the UE 102 may determine to apply the RRC parameters related to the initial DL BWP configuration A until after the UE 102 is provided a C-RNTI and may determine to apply the RRC parameters related to the initial DL BWP configuration B after the UE 102 is provided a C-RNTI.

In a case that the indication does not indicate the UE keeps RRC parameters related to the initial DL BWP configuration A until after the UE 102 is provided a C-RNTI, the UE 102 may determine to use the search space set index B upon reception of the RRC parameter B. In this case, the UE 102 may determine to apply the RRC parameters related to the initial DL BWP configuration B upon reception of RRC parameters related to the initial DL BWP configuration B.

Additionally or alternatively, the indication can be used to indicates whether the UE needs to keep RRC parameters related to initial DL BWP configuration A until the UE 102 is in RRC_CONNECTED state. In other words, the indication can be used to indicates whether the UE needs to keep RRC parameters related to initial DL BWP configuration A when the UE 102 is in RRC_IDLE state or RRC_INACTIVE state. In a case that the indication indicates the UE keeps RRC parameters related to the initial DL BWP configuration A until the UE 102 is in RRC_CONNECTED state, the UE 102 may determine to use the search space set index A until the UE 102 is in RRC_CONNECTED state. In this case, the UE 102 may determine to use the search space set index B during the UE 102 is in RRC_CONNECTED state. In this case, the UE 102 may determine to apply the RRC parameters related to the initial DL BWP configuration A until the UE 102 is in RRC_CONNECTED state and may determine to apply the RRC parameters related to the initial DL BWP configuration B during the UE 102 is in RRC_CONNECTED.

In a case that the indication does not indicate the UE keeps RRC parameters related to the initial DL BWP configuration A until the UE 102 is in RRC_CONNECTED state, the UE 102 may determine to use the search space set index B upon reception of the RRC parameter B. In this case, the UE 102 may determine to apply the RRC parameters related to the initial DL BWP configuration B upon reception of RRC parameters related to the initial DL BWP configuration B. Herein, 'until the UE 102 is in RRC_CONNECTED' and 'when/during the UE 102 is in RRC_IDLE state or in RRC_INACTIVE state' can be interchanged with each other.

In the implementation of the present disclosure, RRC parameters related to initial DL BWP configurations A can be those above-mentioned RRC parameters included in the initial DL BWP configuration A. However, the RRC parameters may not include ra-searchspace which indicates a search space set index of a search space set for random access procedure. That is, the indication can be applied to generic parameters (e.g. locationAndBandwidth, subcarrierSpacing, cyclicPrefix) of the initial Downlink BWP A, cell specific parameters (e.g. pdcch-ConfigCommon) for PDCCH of the initial downlink BWP A expect ra-searchspace, cell specific parameters (e.g. pdsch-ConfigCommon) for the PDSCH of the initial downlink BWP A.

In the implementation of the present disclosure, 'apply RRC parameters related to an initial DL BWP configuration' may imply that the UE 102 may apply the RRC parameters for PDCCH monitoring, PDSCH reception, and may apply the RRC parameters to determine subcarrier spacing of the initial DL BWP provided by the initial DL BWP configuration.

In the implementation, according to how the indication indicates, a more efficient and flexible communication can be provided by base station to UEs. The base station can determine whether to share control signaling and share which control signaling to RedCap UEs and non-RedCap UEs. According to the indication and initial DL BWP configurations A and B, the UE 102 can be aware of how and where to search PDCCH candidates and to receive PDSCH in different phases.

Figure 8:
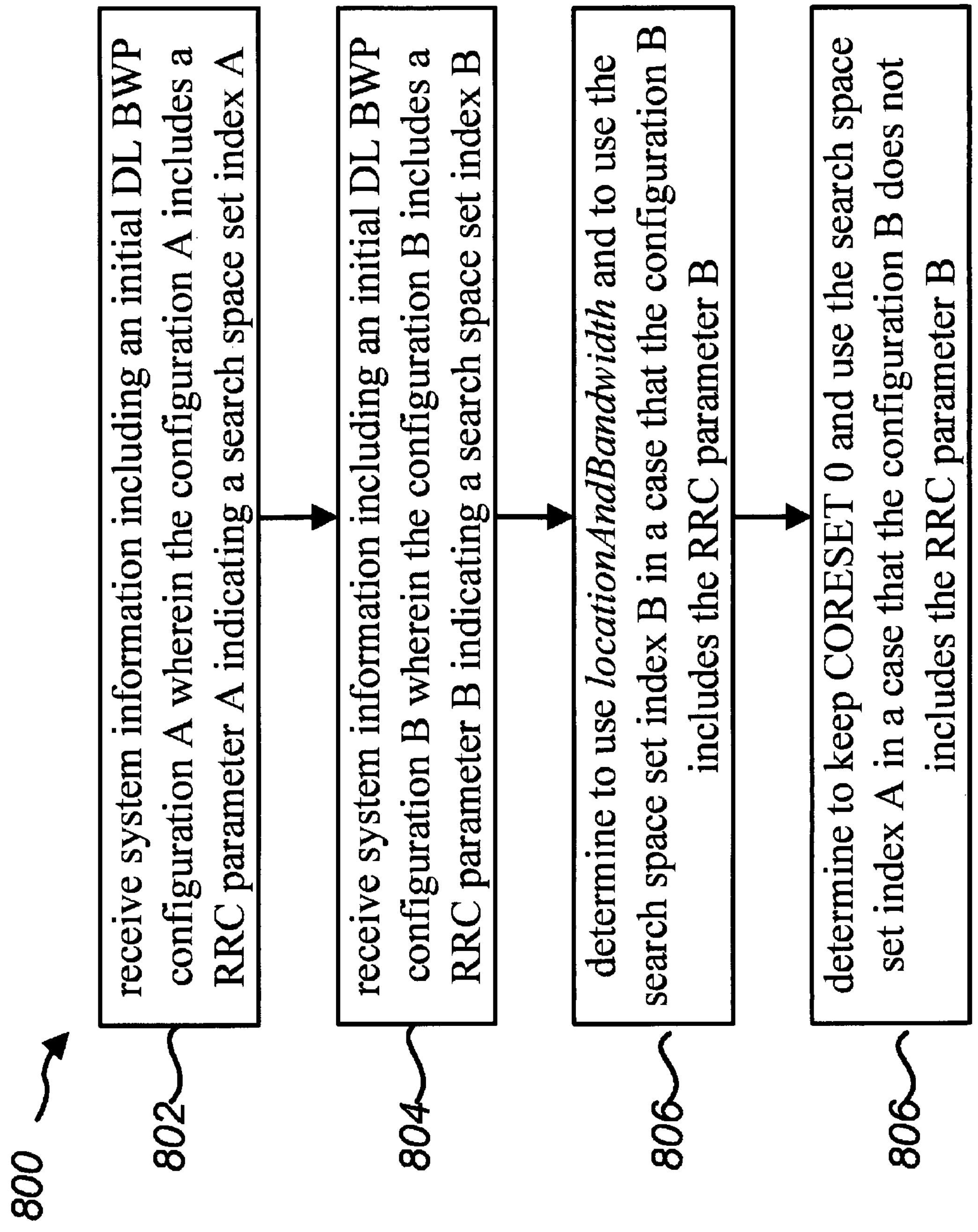
FIG. 8 is a flow diagram illustrating another implementation of a method 800 for monitoring PDCCH for CSS set(s) by a UE 102.

FIG. 8 is a flow diagram illustrating another implementation of a method 800 for monitoring PDCCH for CSS set(s) by a UE 102.

In the implementation of the present disclosure, the base station may configure an initial DL BWP configuration A and configure an initial DL BWP configuration B via system information (e.g., SIB1). In the implementation, the UE 102 may implicitly determine to apply RRC parameters in which of the two initial DL BWP configurations for monitoring PDCCH for CSS set(s). The UE or the UE 102 in the implementation may refer to a RedCap UE.

The UE 102 may receive 802, from a base station 160, system information including an initial DL BWP configuration A (e.g., the above-mentioned RRC parameter initialDownlinkBWP). The initial DL BWP configuration A provides a BWP A (i.e., an initial downlink BWP A) for a PCell. The initial DL BWP configuration A may include generic parameters (e.g. locationAndBandwidth, subcarrierSpacing, cyclicPrefix) of the initial Downlink BWP A, cell specific parameters (e.g. pdcch-ConfigCommon) for PDCCH of the initial downlink BWP A, cell specific parameters (e.g. pdsch-ConfigCommon) for the PDSCH of the initial downlink BWP A. The initial DL BWP configuration A may include a RRC parameter A which indicates a search space set index A. Specifically, the RRC parameter A may be included in the pdcch-ConfigCommon in the initial DL BWP configuration A.

The UE 102 may receive 804, from a base station 160, system information including an initial DL BWP configuration B (e.g., the above-mentioned RRC parameter initialDownlinkBWP-redCap). The initial DL BWP configuration B provides a BWP B (i.e., an initial downlink BWP B) for the PCell. The initial DL BWP configuration B may include generic parameters (e.g. locationAndBandwidth, subcarrierSpacing, cyclicPrefix) of the initial Downlink BWP B, cell specific parameters (e.g. pdcch-ConfigCommon) for PDCCH of the initial downlink BWP B, cell specific parameters (e.g. pdsch-ConfigCommon) for the PDSCH of the initial downlink BWP B. The initial DL BWP configuration B may include a RRC parameter B which indicates a search space set index B. Specifically, the RRC parameter B may be included in the pdcch-ConfigCommon in the initial DL BWP configuration B.

The UE 102 may determine to monitor PDCCH using which one of the search space set index A or search space set index B based on the initial DL BWP configurations A and B. The base station 160 may determine to transmit PDCCH using which one of the search space set index A or search space set index B based on the initial DL BWP configurations A and B.

In a case that the initial DL BWP configuration B includes the RRC parameter B, the UE 102 may determine 806 to use a locationAndBandwidth included in the initial DL BWP configuration B upon reception of the locationAndBandwidth and/or determine to use the search space set index B. The UE 102 may use the locationAndBandwidth to determine the frequency location and bandwidth of the initial DL BWP B provided by the initial DL BWP configuration B. The UE 102 may use the locationAndBandwidth to determine the frequency position of a CORESET provided by the initial DL BWP configuration B. The CORESET provided by the initial DL BWP configuration B can be associated with the search space set with index B.

In a case that the initial downlink BWP configuration B does not include the RRC parameter B, the UE 102 may determine 808 to use or keep frequency location and bandwidth of the CORESET 0 until initiating initial access procedure and determine to use the search space set index A until initiating initial access procedure. In other words, the UE 102 may keep CORESET 0 until initiating initial access procedure for PDCCH monitoring for the search space set with index A and for PDSCH reception scheduled by the PDCCH. That is, the PDCCH transmission for the search space set with index A and corresponding PDSCH transmission would be confined within the bandwidth of the CORESET 0. During and/or after initial access, the UE 102 may use a locationAndBandwidth included in the initial DL BWP configuration B to determine the frequency position of a CORESET provided by the initial DL BWP configuration B. That is, during and/or after initial access, the UE 102 may use the locationAndBandwidth included in the initial DL BWP configuration B for PDCCH monitoring for another search space set (e.g. search space set for random access) and for PDSCH reception scheduled by the PDCCH.

In a case that the initial DL BWP configuration B does not include the RRC parameter B, the UE 102 may determine 808 to apply a locationAndBandwidth included in the initial DL BWP configuration A upon reception of the locationAndBandwidth and may determine to use the search space set index A. The UE 102 may apply the locationAndBandwidth to determine the frequency position of a CORESET provided by the initial DL BWP configuration A. The CORESET can be associated with the search space set with index A. Additionally, the CORESET associated with the search space set with index A can be the CORESET 0 or a CORESET provided by the initial DL BWP configuration A.

According to the implementation, a more efficient and flexible communication can be provided by base station to UEs. The base station can determine whether to share control signaling and share which control signaling to RedCap UEs and non-RedCap UEs by adjusting RRC configuration in these two separate initial DL BWP configurations. According to the initial DL BWP configurations A and B, the UE 102 can be aware of how and where to search PDCCH candidates and to receive PDSCH in different phases. Therefore, control signaling congestion could be also avoided.

In above various implementations of the present disclosure, 'determine to use search space set index A or B' may mean 'the UE 102 may determine to monitor PDCCH candidates in the search space set with index A or B and/or the base station 160 may determine to transmit PDCCH with a DCI format in the search space set with index A or B'. Additionally or alternatively, 'determine to use search space set index A or B' may mean 'the UE 102 may determine to monitor PDCCH for the search space set with index A or B and/or the base station 160 may transmit PDCCH for the search space set with index A or B'.

In above various implementations of the present disclosure, both the RRC parameter A and the RRC parameter B correspond to a search space set, i.e., Type2-PDCCH CSS set, for paging. That is, both the RRC parameter A and the RRC parameter B are used to indicate an index of Type2-PDCCH CSS set for paging. The index indicated by the RRC parameter A can be different from that indicated by the RRC parameter B. In this case, 'determine to use search space set index A' as mentioned in above implementations may mean 'the UE 102 may determine to monitor PDCCH for Type2-PDCCH CSS set for paging on a CORESET associated with the search space set with index A and/or the base station 160 may determine to transmit PDCCH with a DCI format for Type2-PDCCH CSS set for paging on a CORESET associated with the search space set with index A'. On the other hand, 'determine to use search space set index B' as mentioned in above implementations may mean 'the UE 102 may determine to monitor PDCCH for Type2-PDCCH CSS set for paging on a CORESET associated with the search space set with index B on the initial DL BWP provided by the initial DL BWP configuration B and/or the base station 160 may determine to transmit PDCCH with a DCI format for Type2-PDCCH CSS set for paging on a CORESET associated with the search space set with index B on the initial DL BWP provided by the initial DL BWP configuration B'.

Additionally or alternatively, both the RRC parameter A and the RRC parameter B correspond to a search space set, i.e., Type0-PDCCH CSS set, for SIB1. That is, both the RRC parameter A and the RRC parameter B are used to indicate an index of Type0-PDCCH CSS set for SIB1. The index indicated by the RRC parameter A can be different from that indicated by the RRC parameter B. In this case, 'determine to use search space set index A' as mentioned in above implementations may mean 'the UE 102 may determine to monitor PDCCH for Type0-PDCCH CSS set for SIB1 on a CORESET associated with the search space set with index A and/or the base station 160 may determine to transmit PDCCH with a DCI format for Type0-PDCCH CSS set for SIB1 on a CORESET associated with the search space set with index A'. On the other hand, 'determine to use search space set index B' as mentioned in above implementations may mean 'the UE 102 may determine to monitor PDCCH for Type0-PDCCH CSS set for SIB1 on a CORESET associated with the search space set with index B on the initial DL BWP provided by the initial DL BWP configuration B and/or the base station 160 may determine to transmit PDCCH with a DCI format for Type0-PDCCH CSS set for SIB1 on a CORESET associated with the search space set with index B on the initial DL BWP provided by the initial DL BWP configuration B'.

Additionally or alternatively, both the RRC parameter A and the RRC parameter B correspond to a search space set, i.e., Type0A-PDCCH CSS set, for other system information (OSI). That is, both the RRC parameter A and the RRC parameter B are used to indicate an index of Type0A-PDCCH CSS set for other system information. The index indicated by the RRC parameter A can be different from that indicated by the RRC parameter B. In this case, 'determine to use search space set index A' as mentioned in above implementations may mean 'the UE 102 may determine to monitor PDCCH for Type0A-PDCCH CSS set for other system information on a CORESET associated with the search space set with index A and/or the base station 160 may determine to transmit PDCCH with a DCI format for Type0A-PDCCH CSS set for other system information on a CORESET associated with the search space set with index A'. On the other hand, 'determine to use search space set index B' as mentioned in above implementations may mean 'the UE 102 may determine to monitor PDCCH for Type0A-PDCCH CSS set for other system information on a CORESET associated with the search space set with index B on the initial DL BWP provided by the initial DL BWP configuration B and/or the base station 160 may determine to transmit PDCCH with a DCI format for Type0A-PDCCH CSS set for other system information on a CORESET associated with the search space set with index B on the initial DL BWP provided by the initial DL BWP configuration B'.

However, both the RRC parameter A and the RRC parameter B are not used for a search space set i.e., Type1PDCCH-CSS set for random access procedure. That is, both the RRC parameter A and the RRC parameter B are not used to indicate an index of a search space set for random access procedure. In other words, in a case that the initial downlink BWP configuration B includes a RRC parameter indicating an index of a search space for random access procedure, the UE 102 may determine to monitor PDCCH for Type1-PDCCH CSS set for random access procedure, regardless of whether the indication is present and/or how the indication indicates. In this case, the UE 102 may determine to monitor PDCCH for random access procedure, regardless of which RRC states the UE 102 is in, or regardless of whether the UE 102 is before, during or after initial access procedure.

In a case that the initial downlink BWP configuration B does not include a RRC parameter indicating an index of a search space set for random access procedure, the UE 102 may determine to not monitor PDCCH for Type1-PDCCH CSS set for random access procedure, regardless of whether the initial downlink BWP configuration B includes a RRC parameter indicating an index of a search space set for random access procedure, or regardless of whether the indication is present and/or how the indication indicates. In this case, the UE 102 may determine to not monitor PDCCH for random access procedure, regardless of which RRC states the UE 102 is in, or regardless of whether the UE 102 is before, during or after initial access procedure.

By regarding the search space set for random access procedure as an exception, alignment of center frequencies of initial DL BWP and initial UL BWP for TDD bands can be easily performed since there may be no UL transmission before initial access procedure.

In above various implementations of the present disclosure, if the UE 102 is provided a C-RNTI and if the initial DL BWP configuration B does not include the RRC parameter B for a search space set, the UE 102 may determine not to monitor PDCCH for the search space set on the initial DL BWP B provided by the initial DL BWP configuration B. The condition 'if the UE 102 is provided a C-RNTI' can be interchanged with 'if the UE established/resumed/reestablished the RRC connection', or 'if the UE is in RRC_CONNECTED state'.

Figure 9:
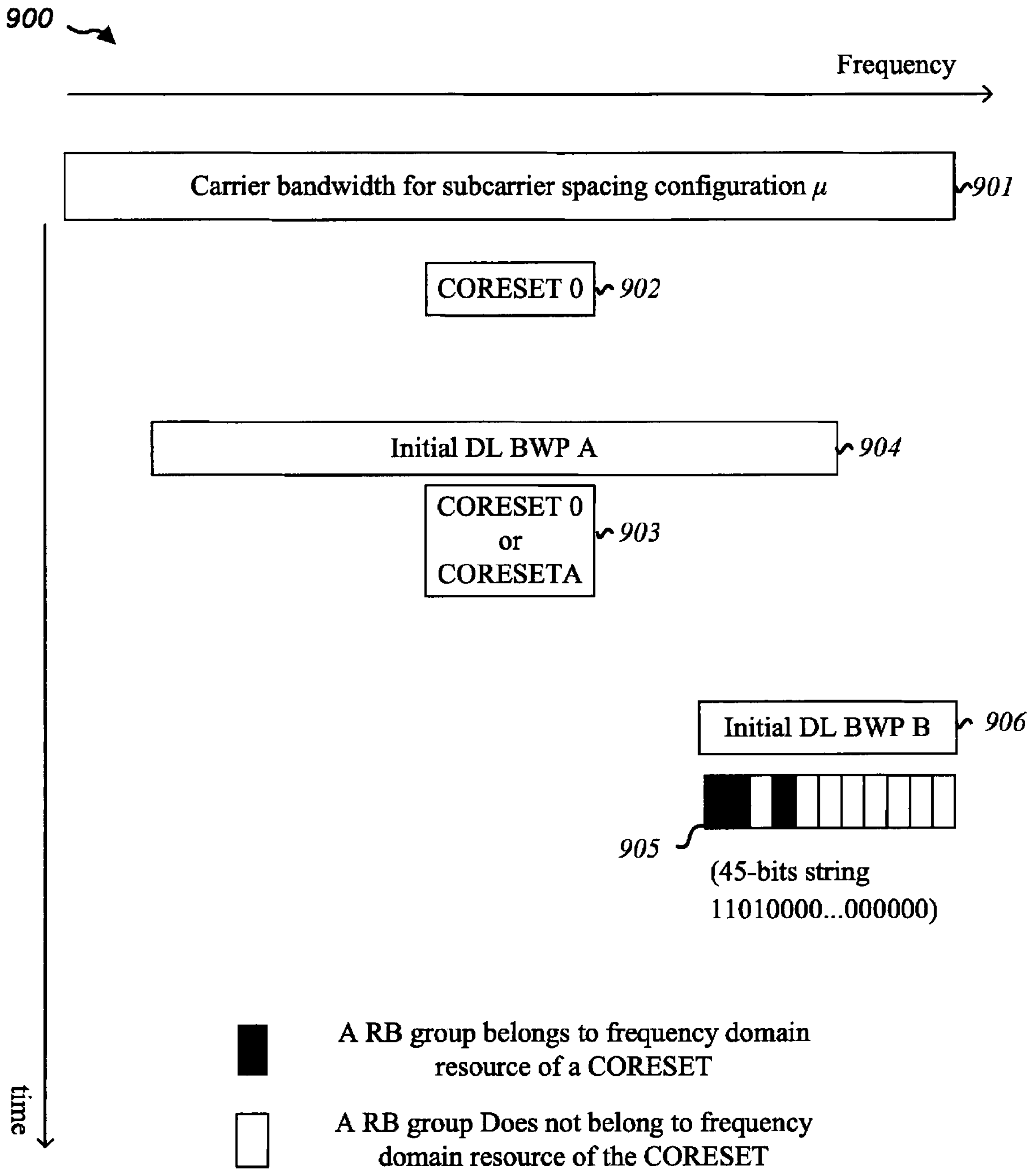
FIG. 9 is a diagram illustrating one 900 example of PDCCH monitoring for CSS set(s) by a UE 102 and a base station 160.

FIG. 9 is a diagram illustrating one 900 example of PDCCH monitoring for CSS set(s) by a UE 102 and a base station 160. The example 900 can be applied to the above various implementations of the present disclosure.

FIG. 9 illustrates an example of SIB 1 providing two initial DL BWP configurations. These two initial DL BWP configurations can correspond to the above-mentioned initial DL BWP configuration A and initial DL BWP configuration B. The UE 102 may determine from the MIB frequency position of a CORESET for Type0-PDCCH CSS set, i.e., CORESET 0 and the Type0-PDCCH CSS set. The UE monitors 902 PDCCH in the Type 0-PDCCH CSS set in the CORESET 0 to receive the SIB1. Then according to the received SIB1, the UE 102 may be provided the initial DL BWP configuration A and the initial DL BWP configuration B.

In a case that the UE 102 determines to use the search space set index A or to apply RRC parameters related to the initial DL BWP configuration A as described in above implementations, the UE 102 may keep CORESET 0 for PDCCH monitoring for the search space set with index A. Herein, the UE 102 may apply locationAndBandwidth included in the initial DL BWP configuration A to determine frequency position of channels and signals for transmission and reception. For example, channels and signals can be CORESET, PDCCH for CSS set(s), PDSCH scheduled by the PDCCH, and so on. If the search space set with index A is associated with a CORESET A 903 other than CORESET 0, the UE 102 may apply a RRC parameter frequencyDomainResource indicating a bit string to determine the frequency position of the CORESET A wherein the RRC parameter frequencyDomainResource is included in the RRC parameter ControlResourceSet provided by the initial DL BWP configuration A. Each bit in the bit string corresponds a group of 6 RBs, with grouping starting from the first RB group in the initial DL BWP A 904. The frequency position of the initial DL BWP A 904 can be determined by the locationAndBandwidth included in the initial DL BWP configuration A.

In a case that the UE 102 determines not to use the search space set index A or not to apply RRC parameters related to the initial DL BWP configuration A as described in above implementations, the UE 102 may not keep CORESET 0 for PDCCH monitoring for the search space set with index B. Herein, the UE 102 may not apply locationAndBandwidth included in the initial DL BWP configuration A to determine frequency position of channels and signals for transmission and reception upon reception of the locationAndBandwidth included in the initial DL BWP configuration A.

In a case that the UE 102 determines to use the search space set index B or to apply RRC parameters related to the initial DL BWP configuration B as described in above implementations, the UE 102 may not keep CORESET 0 for PDCCH monitoring for the search space set with index B. Herein, the UE 102 may apply locationAndBandwidth included in the initial DL BWP configuration B to determine frequency position of channels and signals for transmission and reception. The search space set with index B is associated with a CORESET B 905. The frequency position of the CORESET B is determined by the RRC parameter frequencyDomainResource included in the RRC parameter ControlResourceSet provided by the initial DL BWP configuration B. The frequency position of the initial DL BWP B 906 is determined by the locationAndBandwidth included in the initial DL BWP configuration B.

As an example of the FIG. 9, the base station 160 may transmit to the UE 102 PDCCH in the CORESET A 903 for paging. The UE 102 may monitor PDCCH in the CORESET A 903 for paging. Additionally, the UE 102 may initiate an initial access procedure and monitor PDCCH in the CORESET B 905 for random access. Herein, the UE 102 may keep CORESET 0 until initiating the initial access procedure. The UE 102 may switch to the initial DL BWP B from the CORESET 0 upon initiating the initial access procedure. In other words, the UE 102 may not apply the locationAndBandwidth included in the initial DL BWP configuration B until initiating the initial access procedure. Upon initiating the initial access procedure, the UE 102 may apply the locationAndBandwidth included in the initial DL BWP configuration B.

Hereinafter, random access procedure is described.

In the present disclosure, two types of random access procedure are supported, i.e. 4-step random access procedure and 2-step random access procedure. The 4-step random access procedure can be also referred to as Type-1 random access procedure or as 4-step random access type. The 2-step random access procedure can be also referred to as Type-2 random access procedure or as 2-step random access type. Both types of the random access procedure support contention-based random access (CBRA) and contention-free random access (CFRA).

4-step Random access procedure may include the transmission of random access preamble (Msg1 or Message 1) in a PRACH, the reception of random access response (RAR) message with a PDCCH and/or a PDSCH (Msg2, Message 2), and when applicable, the transmission of a PUSCH scheduled by a RAR UL grant (e.g., Msg 3, Message 3), and the reception of PDSCH for contention resolution.

2-step Random access procedure may include the transmission of random access preamble in a PRACH and of a PUSCH (MsgA), and the reception of a RAR message with a PDCCH and/or a PDSCH (MsgB), and when applicable, the transmission of a PUSCH scheduled by a fallback RAR UL grant, and the reception of PDSCH for contention resolution.

The base station may transmit a set of SS/PBCH blocks in a serving cell and indicate the indices of the transmitted SS/PBCH blocks within a half-frame to UEs camping on the serving cell via SIB1. In other words, the base station 160 may indicate the time domain positions of the transmitted SS/PBCH blocks within a half frame. As above-mentioned, upon detection of a SS/PBCH block with an index, a UE may determine from the MIB a CORESET for Type0-PDCCH CSS set and the Type0-PDCCH CSS set. The UE monitors PDCCH in the Type 0-PDCCH CSS set to receive the SIB1. Then according to the received SIB1, the UE may determine, within a half-frame, a set of SS/PBCH blocks which are transmitted by the base station. In other words, the UE may determine, within a half-frame, the time domain positions of a set of SS/PBCH blocks which are transmitted by the base station.

Before initiating a random access procedure, the UE 102 may, based on the received SIB1, obtain a set of SS/PBCH block indexes. A set of SS/PBCH blocks corresponding to the indexes in the set of SS/PBCH block indexes are transmitted by the base station. That is, the base station 160 may notify the UE 102 of the set of SS/PBCH blocks that are transmitted by the base station via a parameter included in the SIB1. The UE 102 may perform reference signal received power (RSRP) measurements for the set of SS/PBCH blocks. On the other hand, the UE 102 may not perform RSRP measurements for those candidate SS/PBCH blocks which are not transmitted by the base station.

The secondary synchronization signals of a SS/PBCH block is used for the RSRP determination for the corresponding SS/PBCH block. The number of resource elements carrying the secondary synchronization signals of the SS/PBCH block (or the SS/PBCH blocks with the same SS/PBCH block index) within a measurement period may be used by the UE 102 to determine the RSRP of the SS/PBCH block. Additionally, the demodulation reference signals for PBCH of the SS/PBCH block and/or configured CSI reference signals can also be used by the UE 102 to determine the RSRP of the SS/PBCH block.

Before initiating a random access procedure, the UE 102 may receive, from the base station 160, the information for the random access procedure. The information (i.e. cell specific random access configuration(s)) includes the cell specific random access parameters and/or the dedicated random access parameters. The random access information may be indicated by the broadcasted system information (e.g., MIB, SIB1, and/or other SIBs) and/or RRC message and so on. For example, the information may include the configuration of PRACH transmission parameters such as time resources for PRACH transmission, frequency resources for PRACH transmission, the PRACH preamble format, preamble SCS and so on. The information may also include parameters for determining the root sequences (logical root sequence index, root index) and their cyclic shifts (CSs) in the PRACH preamble sequence set.

The random access preamble (PRACH preamble, or preamble) sequence is based on the Zadoff-Chu sequence. The logical root for the Zadoff-Chu sequence is provided by the information as above-mentioned. That is, a UE can generate a set of PRACH preamble sequences based on the Zadoff-Chu sequence corresponding to a root sequence indicated by the base station 160. There are two sequence lengths for the preamble. One is 839 and the other one is 139.

A preamble is transmitted by the UE 102 in a time-frequency PRACH occasion. A PRACH occasion is a time-frequency resource where the base station configures to multiple UEs for preamble transmission. Three are 64 preambles defined in each time-frequency PRACH occasion. In other words, the UE 102 may generate 64 preambles for each PRACH occasion. The preambles (e.g. 64 preambles) in one PRACH occasion may be generated by one root Zadoff-Chu sequence or more than one root Zadoff-Chu sequences. The number of preambles generated from a single root Zadoff-Chu sequence at least depends on the sequence length and/or a distance of the cyclic shifts between two preambles with consecutive preamble indices. The distance of the cyclic shifts is provided by the base station 160.

Therefore, in some cases, the UE 102 can generate 64 preambles from a single root Zadoff-Chu sequence. In some cases, the UE 102 cannot generate 64 preambles from a single root Zadoff-Chu sequence. In these cases, in order to obtain the 64 preambles in a PRACH occasion, the UE 102 needs to generate the 64 preambles from multiple root Zadoff-Chu sequences with multiple consecutive root indices. The starting root index of the multiple consecutive root indices is indicated by the base station 160. The UE 102 and the base station 160 may enumerate the 64 preambles in increasing order of first increasing cyclic shift (CS) of a logical root Zadoff-Chu sequence, and then in increasing order of the logical root sequence index. The preamble indices for 64 preambles in a PRACH occasion are from 0 to 63.

The random access information (i.e., random access configuration(s)) may include a RRC parameter indicating how many SS/PBCH blocks is associated with a PRACH occasion. For example, if a value indicated by the RRC parameter is one half (i.e. ½), it implies that one SS/PBCH block is associated with two PRACH occasions. For example, if a value indicated by the RRC parameter is two (i.e. 2), it implies that two SS/PBCH blocks are associated with one PRACH occasion.

In addition, the random access information may include a RRC parameter indicating how many frequency multiplexed PRACH occasions there are in one time instance. The random access information may include a RRC parameter indicating an offset of lowest PRACH occasion in frequency domain with respective to PRB0 of the active UL BWP. The UE 102 may determine starting symbol of a PRACH occasion, a number of PRACH occasions in time domain within a PRACH slot, a duration in symbols of the PRACH occasion according to the random access information.

As above-mentioned, SIB1 indicates a set of SS/PBCH blocks which are transmitted by the base station. In other words, the SIB1 provides SS/PBCH block indexes with which a set of SS/PBCH blocks are transmitted by the base station. The base station and/or the UE may only map the SS/PBCH indexes provided in the SIB1 to the PRACH occasions in accordance with the following rules: (i) first, in increasing order of preamble indexes within a single PRACH occasion, (ii) second, in increasing order of frequency resource indexes for frequency multiplexed PRACH occasions, (iii) third, in increasing order of time resource indexes for time multiplexed PRACH occasions within a PRACH slot, (iv) in increasing order of indexes for PRACH slots.

Figure 10:
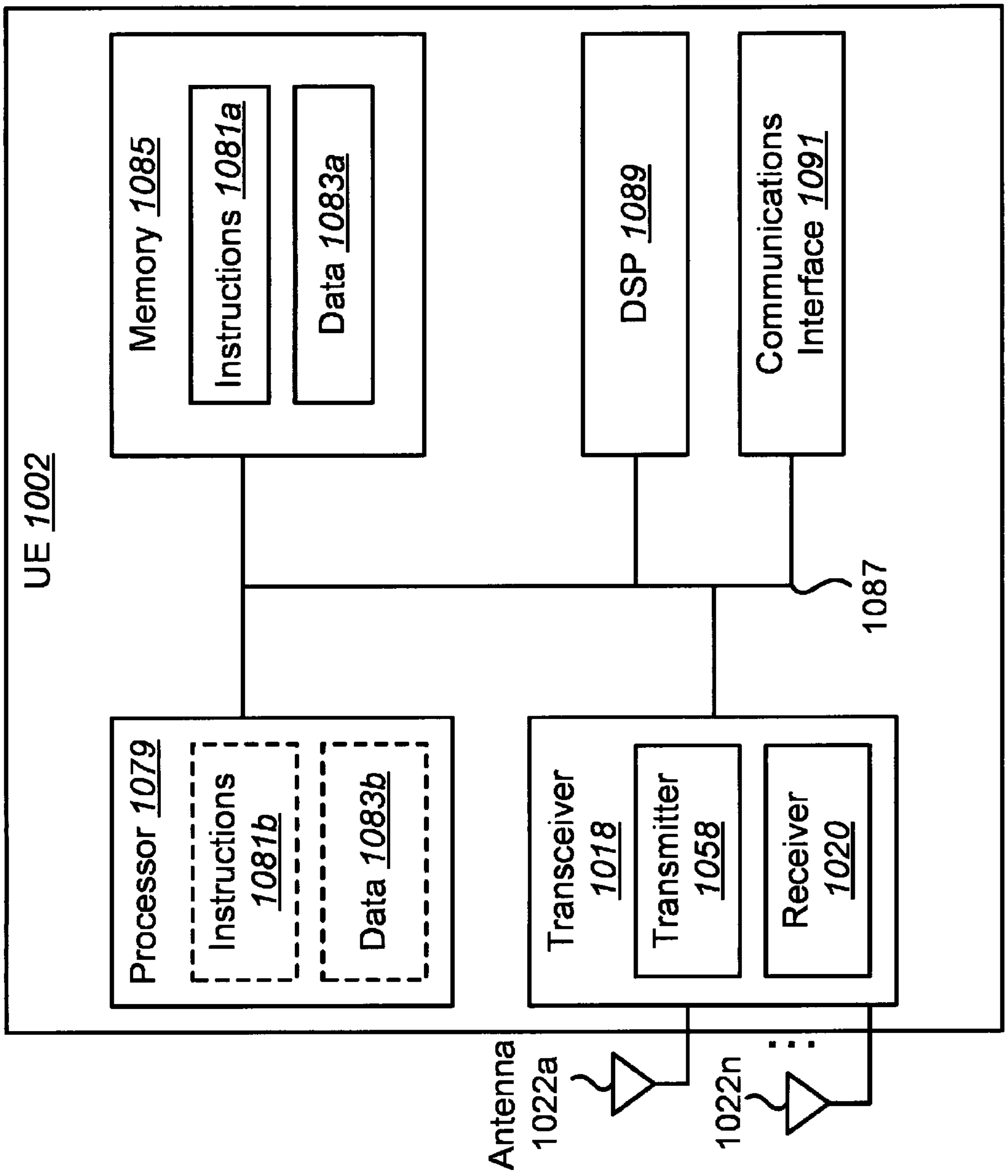
FIG. 10 illustrates various components that may be utilized in a UE.

FIG. 10 illustrates various components that may be utilized in a UE 1002. The UE 1002 (UE 102) described in connection with FIG. 10 may be implemented in accordance with the UE 102 described in connection with FIG. 1. The UE 1002 includes a processor 1081 that controls operation of the UE 1002. The processor 1081 may also be referred to as a central processing unit (CPU). Memory 1087, which may include read-only memory (ROM), random access memory (RAM), a combination of the two or any type of device that may store information, provides instructions 1083*a* and data 1085*a* to the processor 1081. A portion of the memory 1087 may also include non-volatile random access memory (NVRAM). Instructions 1083*b* and data 1085*b* may also reside in the processor 1081. Instructions 1083*b* and/or data 1085*b* loaded into the processor 1081 may also include instructions 1083*a* and/or data 1085*a* from memory 1087 that were loaded for execution or processing by the processor 1081. The instructions 1083*b* may be executed by the processor 1081 to implement one or more of the methods 200 described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022*a-n* are attached to the housing and electrically coupled to the transceiver 1018.

The various components of the UE 1002 are coupled together by a bus system 1089, which may include a power bus, a control signal bus and a status signal bus, in addition to a data bus. However, for the sake of clarity, the various buses are illustrated in FIG. 10 as the bus system 1089. The UE 1002 may also include a digital signal processor (DSP) 1091 for use in processing signals. The UE 1002 may also include a communications interface 1093 that provides user access to the functions of the UE 1002. The UE 1002 illustrated in FIG. 10 is a functional block diagram rather than a listing of specific components.

Figure 11:
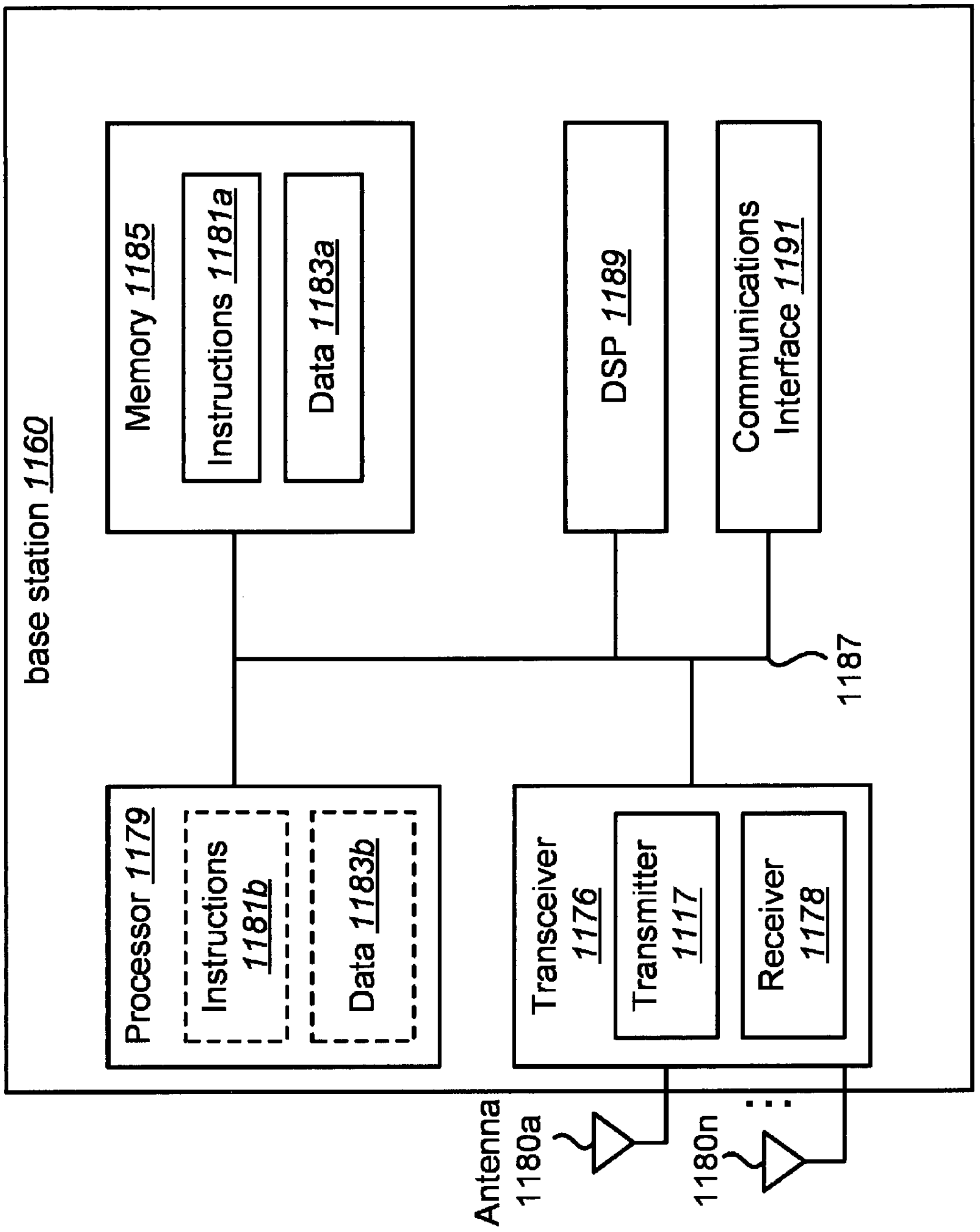
FIG. 11 illustrates various components that may be utilized in a base station.

FIG. 11 illustrates various components that may be utilized in a base station 1160. The base station 1160 described in connection with FIG. 11 may be implemented in accordance with the base station 160 described in connection with FIG. 1. The base station 1160 includes a processor 1181 that controls operation of the base station 1160. The processor 1181 may also be referred to as a central processing unit (CPU). Memory 1187, which may include read-only memory (ROM), random access memory (RAM), a combination of the two or any type of device that may store information, provides instructions 1183*a* and data 1185*a* to the processor 1181. A portion of the memory 1187 may also include non-volatile random access memory (NVRAM). Instructions 1183*b* and data 1185*b* may also reside in the processor 1181. Instructions 1183*b* and/or data 1185*b* loaded into the processor 1181 may also include instructions 1183*a* and/or data 1185*a* from memory 1187 that were loaded for execution or processing by the processor 1181. The instructions 1183*b* may be executed by the processor 1181 to implement one or more of the methods 300 described above.

The base station 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180*a-n* are attached to the housing and electrically coupled to the transceiver 1176.

The various components of the base station 1160 are coupled together by a bus system 1189, which may include a power bus, a control signal bus and a status signal bus, in addition to a data bus. However, for the sake of clarity, the various buses are illustrated in FIG. 11 as the bus system 1189. The base station 1160 may also include a digital signal processor (DSP) 1191 for use in processing signals. The base station 1160 may also include a communications interface 1193 that provides user access to the functions of the base station 1160. The base station 1160 illustrated in FIG. 11 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:

reception circuitry configured to receive, from a base station, a system information block type 1 (SIB1) including a first initial downlink (DL) bandwidth part (BWP) configuration and a second initial DL BWP configuration for a cell, wherein the first initial DL BWP configuration includes a first radio resource control (RRC) parameter indicating a first search space set for other system information (OSI); and control circuitry configured to:

in a first case that the second initial DL BWP configuration includes a second RRC parameter indicating a second search space set for OSI, determine to monitor a physical downlink control channel (PDCCH) for receiving the OSI in the second search space set on a second initial DL BWP provided by the second initial DL BWP configuration, and in a second case that the second initial DL BWP configuration does not include the second RRC parameter, determine to monitor a PDCCH for receiving the OSI in the first search space set on a first initial DL BWP provided by the first initial DL BWP configuration.

2. The UE of claim 1, wherein the control circuitry is further configured to, in the second case, determine to use a DL BWP for PDCCH and physical downlink shared channel (PDSCH) reception during an initial access and after the initial access, and a bandwidth and location of the DL BWP is indicated by an RRC parameter locationAndBandwidth included in the second initial DL BWP configuration.

3. A base station, comprising:

transmission circuitry configured to transmit, to a user equipment (UE), a system information block type 1 (SIB1) including a first initial downlink (DL) bandwidth part (BWP) configuration and a second initial DL BWP configuration for a cell, wherein the first initial DL BWP configuration includes a first radio resource control (RRC) parameter indicating a first search space set for other system information (OSI); and control circuitry configured to:

in a first case that the second initial DL BWP configuration includes a second RRC parameter indicating a second search space set for OSI, determine to transmit, to the UE, a physical downlink control channel (PDCCH) for receiving the OSI in the second search space set on a second initial DL BWP provided by the second initial DL BWP configuration, and in a second case that the second initial DL BWP configuration does not include the second RRC parameter, determine to transmit, to the UE, a PDCCH for the OSI reception in the first search space set on a first initial DL BWP provided by the first initial DL BWP configuration.

4. The base station of claim 3, wherein the control circuitry is further configured to, in the second case, determine to use a DL BWP for PDCCH and physical downlink shared channel (PDSCH) transmission to the UE during and initial access and after the initial access, and a bandwidth and location of the DL BWP is indicated by an RRC parameter locationAndBandwidth included in the second initial DL BWP configuration.

5. A communication method performed by a user equipment (UE), the method comprising:

receiving, from a base station, a system information block type 1 (SIB1) including a first initial downlink (DL) bandwidth part (BWP) configuration and a second initial DL BWP configuration for a cell, wherein the first initial DL BWP configuration includes a first radio resource control (RRC) parameter indicating a first search space set for other system information (OSI);

determining to monitor a physical downlink control channel (PDCCH) for receiving the OSI in a second search space set on a second initial DL BWP provided by the second initial DL BWP configuration in a first case that the second initial DL BWP configuration includes a second RRC parameter indicating the second search space set for OSI; and determining to monitor a PDCCH for receiving the OSI in the first search space set on a first initial DL BWP provided by the first initial DL BWP configuration in a second case that the second initial DL BWP configuration does not include the second RRC parameter.

* * * * *